(12) United States Patent
Lee et al.

(10) Patent No.: US 9,361,733 B2
(45) Date of Patent: Jun. 7, 2016

(54) PORTABLE DEVICE AND METHOD OF CONTROLLING THEREFOR

(71) Applicant: LG ELECTRONICS INC., Seoul (KR)

(72) Inventors: Doyoung Lee, Seoul (KR); Sinae Chun, Seoul (KR); Yongsin Kim, Seoul (KR); Hyorim Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 162 days.

(21) Appl. No.: 14/324,822

(22) Filed: Jul. 7, 2014

(65) Prior Publication Data

US 2015/0062163 A1  Mar. 5, 2015

Related U.S. Application Data

(63) Continuation-in-part of application No. 14/142,445, filed on Dec. 27, 2013, now Pat. No. 8,817,047.

(30) Foreign Application Priority Data

Sep. 2, 2013 (KR) .................. 10-2013-0105125
Jan. 16, 2014 (WO) ............... PCT/KR2014/000478

(51) Int. Cl.
*G06T 19/00* (2011.01)
*G06T 11/00* (2006.01)
*G06T 7/00* (2006.01)
*G09G 3/00* (2006.01)

(52) U.S. Cl.
CPC ............. *G06T 19/006* (2013.01); *G09G 3/003* (2013.01); *G09G 2340/10* (2013.01); *G09G 2340/12* (2013.01); *G09G 2340/125* (2013.01); *G09G 2340/14* (2013.01); *G09G 2340/145* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 2009/0322671 A1 | 12/2009 | Scott et al. | |
| 2011/0221669 A1 | 9/2011 | Shams et al. | |
| 2012/0019557 A1 | 1/2012 | Aronsson et al. | |

(Continued)

FOREIGN PATENT DOCUMENTS

WO   WO 2010/094065 A1   8/2010

OTHER PUBLICATIONS

A. Henrysson, "Bringing Augmented Reality to Mobile Phones." Linkoping Studies in Science and Technology, Sissertations, No. 1145, CUGS, National Graduate School of Computer Science, 2007, 80 pages.

(Continued)

*Primary Examiner* — Ulka Chauhan
*Assistant Examiner* — Schiller Hill
(74) *Attorney, Agent, or Firm* — Birch, Stewart, Kolasch & Birch, LLP

(57) ABSTRACT

A portable device is disclosed. A method of controlling a portable device, comprising the steps of capturing an image in front of the portable device, detecting a marker object from the image, displaying a virtual image corresponding to the marker object based on a location of the marker object, and terminating a display of the virtual image corresponding to the marker object, when the detecting of the marker object is terminated, terminate a display of the virtual image based on a first terminate mode if the gaze location of the user is detected at a first location, and terminate the display of the virtual image based on a second terminate mode if the gaze location of the user is detected at a second location.

20 Claims, 32 Drawing Sheets

(56) References Cited

U.S. PATENT DOCUMENTS

| | | | |
|---|---|---|---|
| 2012/0057794 A1 | 3/2012 | Tsurumi et al. | |
| 2012/0143361 A1 | 6/2012 | Kurabayashi et al. | |
| 2013/0155307 A1 | 6/2013 | Bilbrey et al. | |
| 2013/0215148 A1* | 8/2013 | Antonyuk | G06T 19/006 345/633 |
| 2014/0195918 A1* | 7/2014 | Friedlander | G06F 3/04842 715/727 |

OTHER PUBLICATIONS

Gammeter et al., "Server-Side Object Recognition and Client-Side Object Tracking for Mobile Augmented Reality," Computer Vision and Pattern Recognition Workshops (CVPRW), 2010 IEEE Computer Society Conference on IEEE, 2010, 8 pages.

Goldman et al., "Video Object Annotation, Navigation, and Composition," Proceedings of the 21st Annual ACM Symposium on User Interface Software and Technology, ACM, 2008, 10 pages.

Livingston et al. "Military Applications of Augmented Reality," Handbook of Augmented Reality, Springer New York, 2011, 671-706.

Ulbricht et al,. "Tangible Augmented Reality for Computer Games," Proceedings of the Third IASTED International Conference on Visualization, Imaging and Image Processing, 2003, 5 pages.

* cited by examiner

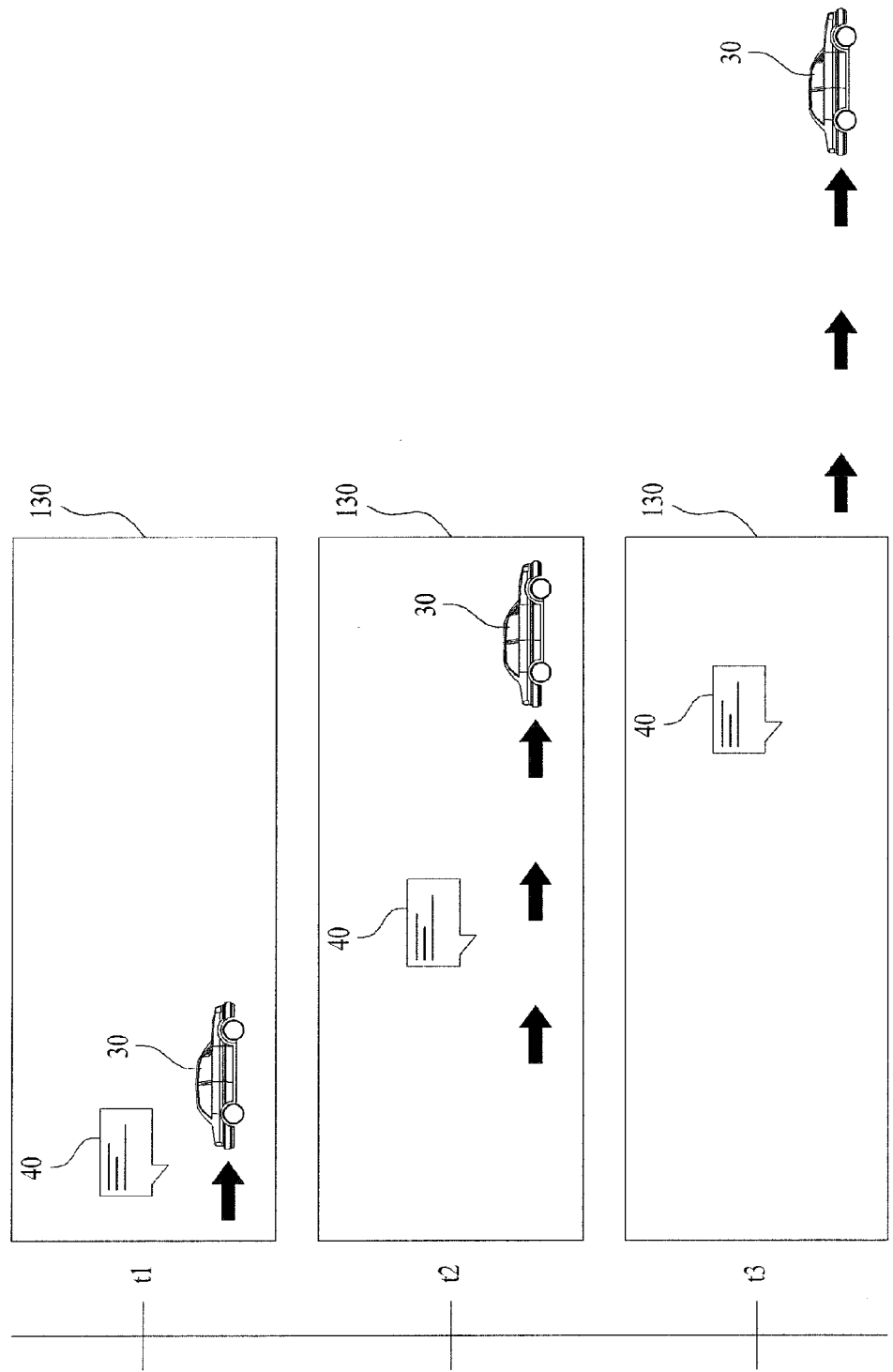

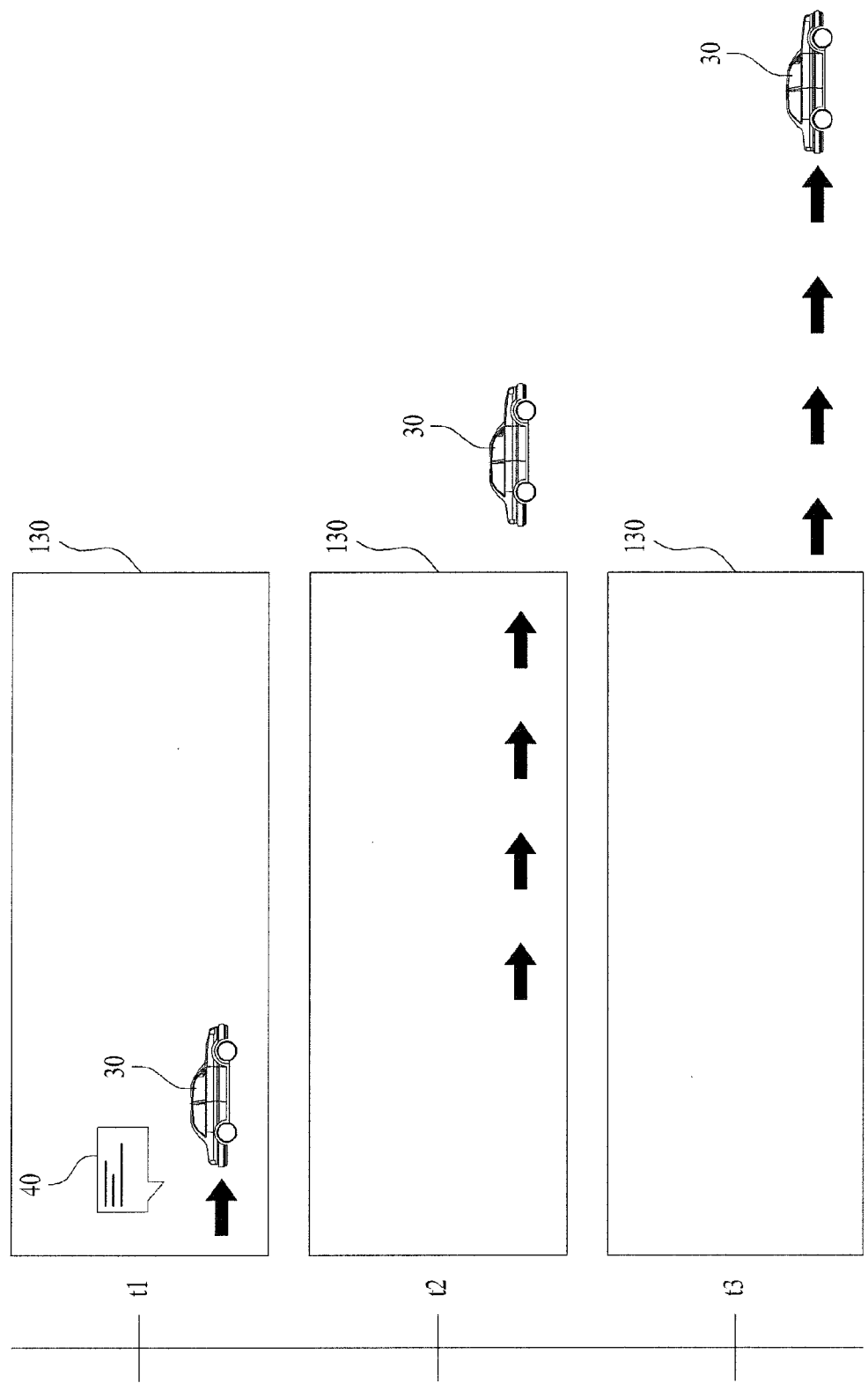

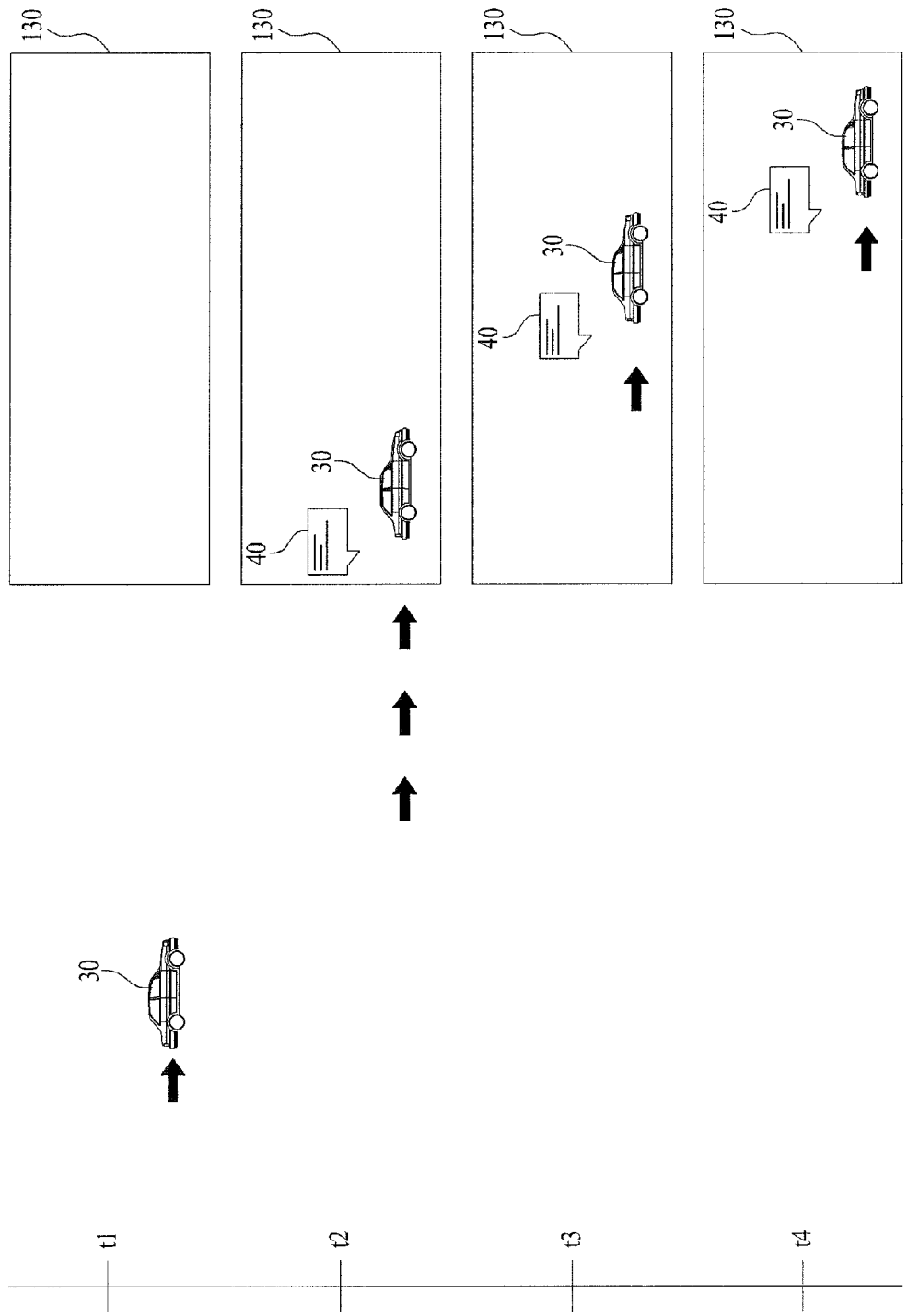

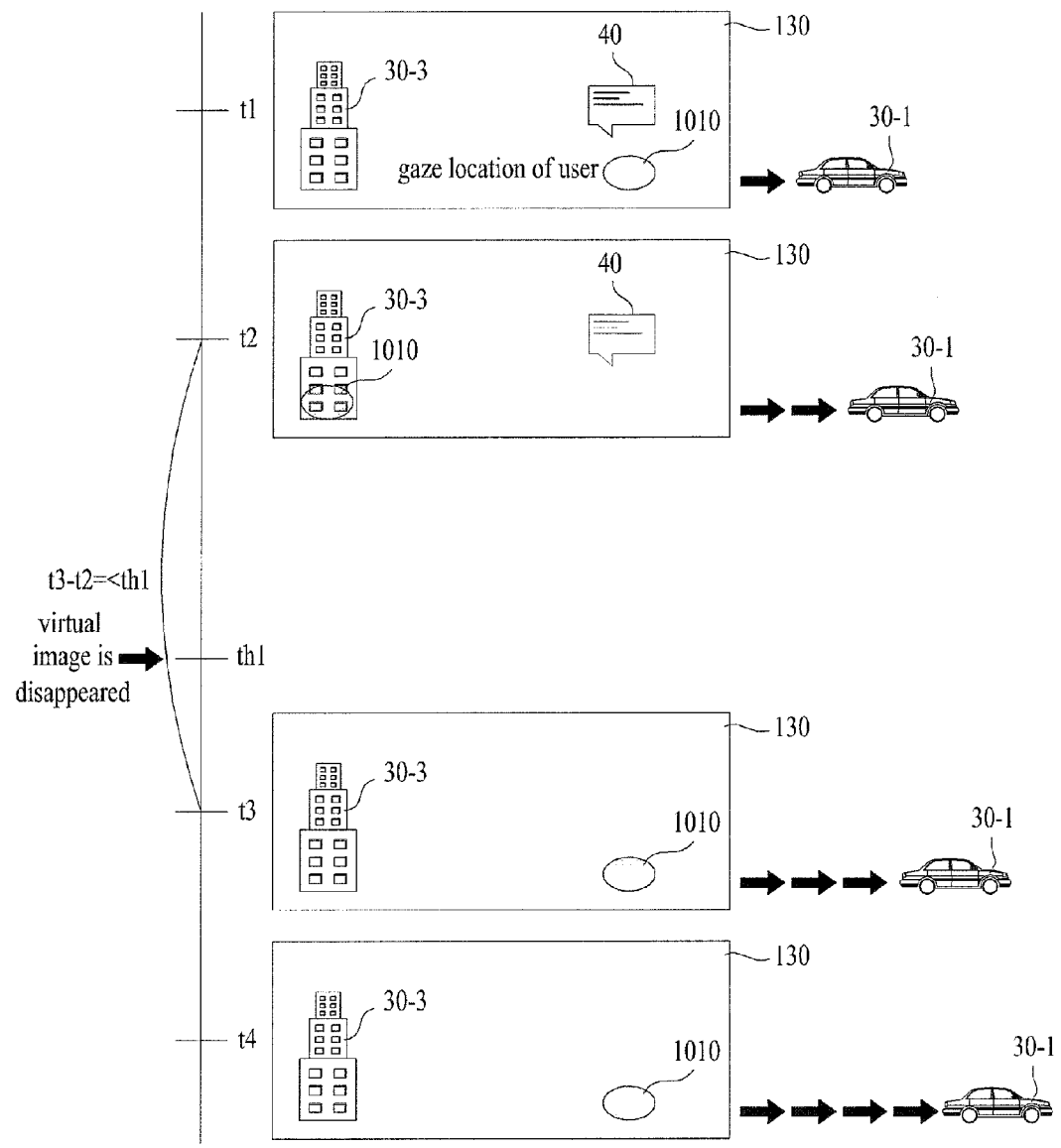

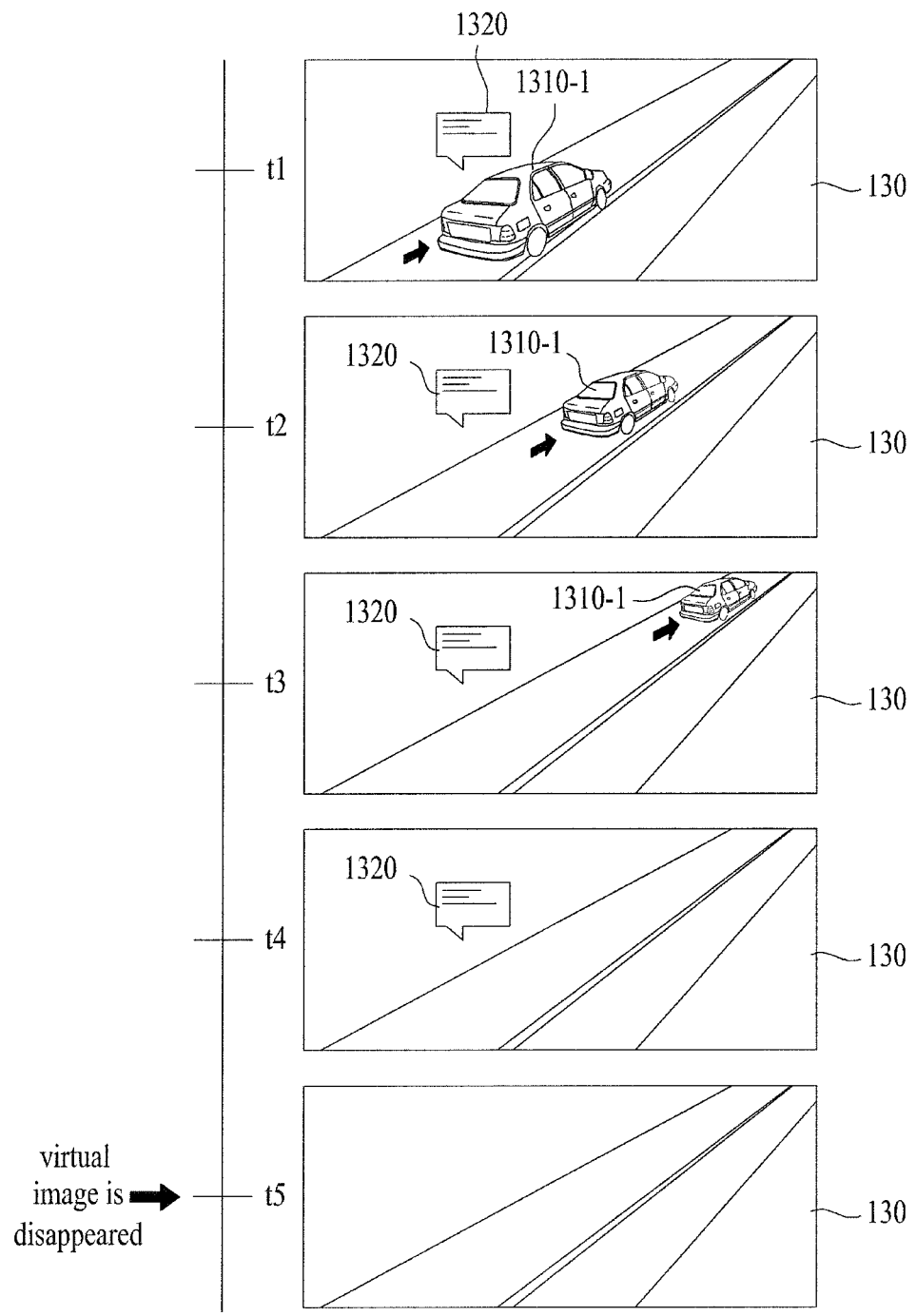

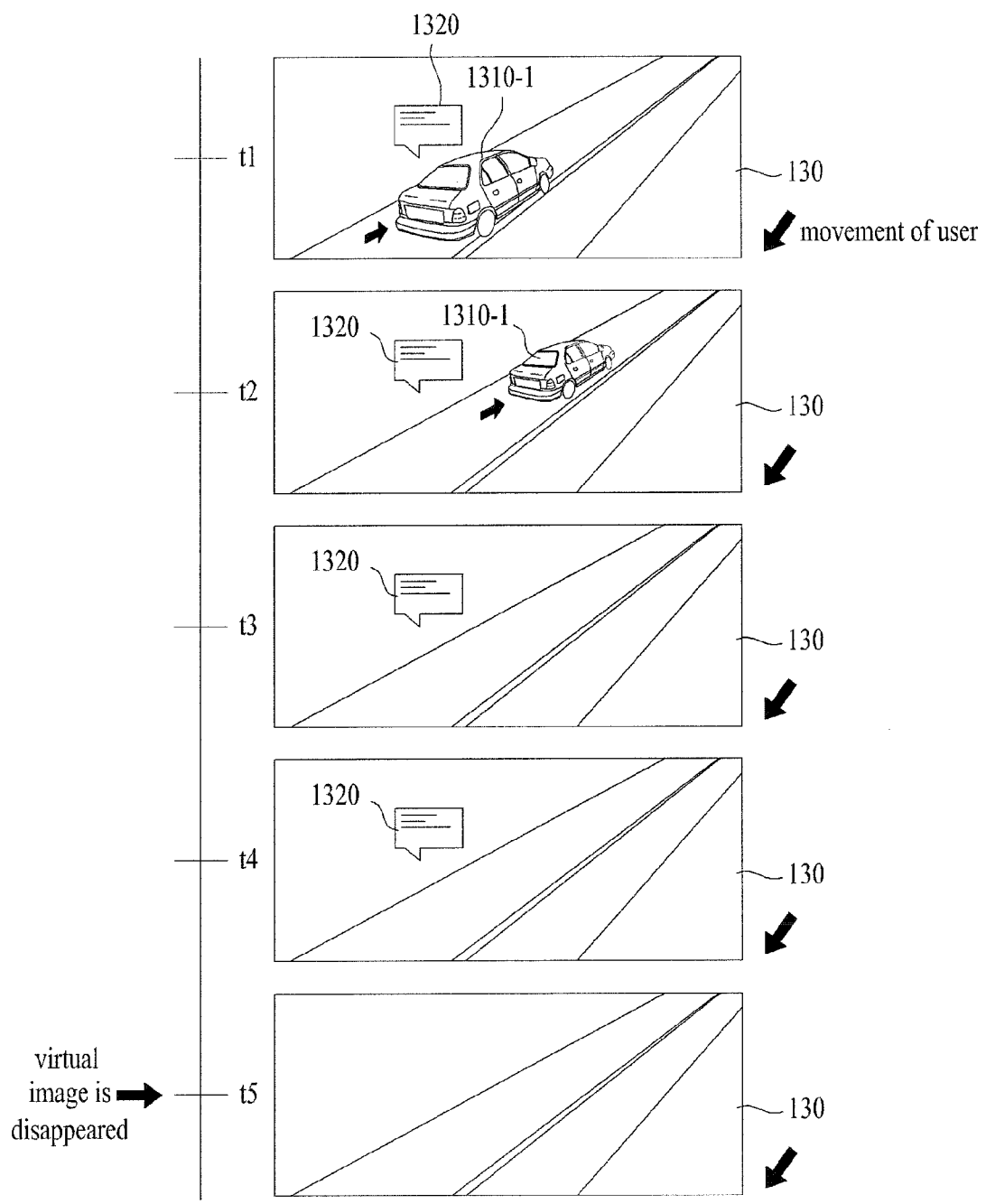

PORTABLE DEVICE AND METHOD OF CONTROLLING THEREFOR

This application is a Continuation-in-Part of U.S. application Ser. No. 14/142,445 filed on Dec. 27, 2013. This application also claims the priorities to Patent Application No. 10-2013-0105125 filed in the Republic of Korea on Sep. 2, 2013 and International Patent Application No. PCT/KR2014/000478 filed on Jan. 28, 2014, all of which are hereby incorporated by reference as if fully set forth herein.

BACKGROUND OF THE INVENTION

1. Field of the Invention

The present specification relates to a portable device, and more particularly, to a portable device providing an augmented reality (AR) service by displaying a virtual image for a real object and a method of controlling therefor.

2. Discussion of the Related Art

As a technology has been developed, a portable device changes itself as a smart device capable of providing various services to a user. Recently, the portable device is utilized as a device providing an augmented reality (AR) service, which corresponds to a service showing a real image and a virtual image together in a manner of mixing both images.

The portable device provides the AR service using a method that a virtual image corresponding to a real object, which is detected from a nearby image, is displayed in a manner of being overlapped to the real object.

In case of providing the AR service with the aforementioned display method, if the real object moves fast, the virtual image moves fast as well. Hence, it is difficult for a user to observe the virtual image or to obtain information included in the virtual image.

SUMMARY OF THE INVENTION

Accordingly, the present specification is directed to an apparatus and method thereof that substantially obviate one or more problems due to limitations and disadvantages of the related art.

In providing an AR service, an object of the present specification is to provide a portable device changing a method of displaying a virtual image according to whether the virtual image moves and a moving speed of the virtual image and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a portable device according to one embodiment includes a camera unit configured to capture an image in front of the portable device, a display unit configured to display a virtual image, and a processor configured to control the camera unit and the display unit, the processor further configured to detect a marker object from the image, display the virtual image corresponding to the marker object based on a position of the marker object when the marker object is detected, detect a position change of the marker object, move the virtual image according to the position change when the position change is detected, and obtain a first moving speed of the virtual image or a second moving speed of the marker object, when the first moving speed or the second moving speed is faster than a first reference speed, lower the first moving speed to less than the first reference speed.

To achieve these objects and other advantages and in accordance with the purpose of the invention, as embodied and broadly described herein, a method of controlling a portable device includes the steps of capturing an image in front of the portable device, detecting a marker object from the image, when the marker object is detected, obtaining an information on the virtual image corresponding to the marker object and displaying the virtual image based on a position of the marker object, detecting a position change of the marker object, when the position change is detected, moving the virtual image according to the position change and obtaining a moving speed of the virtual image or a moving speed of the marker object, and when the moving speed of the virtual image or the moving speed of the marker object is faster than a first reference speed, lowering the moving speed of the virtual image less than the first reference speed.

In order to solve the aforementioned technical task, according to one embodiment, a portable device includes a camera unit configured to capture an image in front of the portable device, a display unit configured to display a virtual image, a sensor unit configured to detect a gaze location of a user and deliver the detected gaze location to a processor and the processor configured to control the camera unit, the display unit and the sensor unit, the processor configured to detect a marker object from the image, the processor configured to display the virtual image corresponding to the marker object based on a location of the marker object, when detecting of the marker object is terminated, the processor, if the gaze location of the user is detected at a first location, configured to terminate a display of the virtual image based on a first terminate mode, the processor, if the gaze location of the user is detected at a second location, configured to terminate the display of the virtual image based on a second terminate mode.

A method of controlling a portable device includes the steps of capturing an image in front of the portable device, detecting a marker object from the image, displaying a virtual image corresponding to the marker object based on a location of the marker object and terminating a display of the virtual image corresponding to the marker object. When the detecting of the marker object is terminated, if the gaze location of the user is detected at a first location, a display of the virtual image is terminated based on a first terminate mode. If the gaze location of the user is detected at a second location, the display of the virtual image can be terminated based on a second terminate mode.

According to the present specification, a portable device according to one embodiment can provide a user-friendly AR service. More specifically, in providing an AR service, the portable device can provide a virtual image readable by a user irrespective of a moving speed of a marker object in a manner of controlling a moving speed of the virtual image moving in accordance with a position change of the marker object. And, in case of controlling the moving speed of the virtual image, the portable device can further enhance readability of the virtual image in a manner of changing a method of displaying the virtual image. And, the portable device can determine whether the virtual image is continuously displayed according to the moving speed of the detected virtual image or a size of the marker object and then can stop displaying an unnecessary virtual image, thereby reducing power consumption of the portable device.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 5A-5D are diagrams of a portable device displaying a virtual image in accordance with a moving speed of the virtual image according to one embodiment;

FIGS. 11A-11B are diagrams for a method of terminating a display of a virtual image based on time of changing a user gaze according to one embodiment;

FIGS. 13A-13C are diagrams for a method of terminating a display of a virtual image 1320 in consideration of a moving speed and a moving direction of a user;

DETAILED DESCRIPTION OF THE INVENTION

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Moreover, while the embodiments have been concretely described with reference to the attached diagrams and the contents written on the diagrams, a scope of claims may be non-restricted or non-limited to the embodiments.

The present specification relates to a portable device. In the present specification, the portable device corresponds to a portable electronic device and may mean an electronic device capable of capturing an image in front of the device, detecting a marker object from the captured image, and displaying a virtual image related to the detected marker object. For instance, the portable device may correspond to such various electronic devices as a smartphone, a smart pad, a personal digital assistant (PDA), a tablet PC, a smart table, a head mounted display (HMD), or the like.

In the present specification, a marker object may mean an object including a marker to indicate whether a related virtual image exists or whether a virtual image is displayed. In this case, the marker may correspond to a promised pattern or a form of a code equipped on a surface of a random object. Or, the marker may correspond to a random object itself. These kinds of all optical identifiers can be called a marker. And, in the present specification, a virtual image corresponds to an image consisted of a text and a graphic and indicates an image configured to provide an augmented reality information related to a marker object to a user. For instance, if the marker object corresponds to a bus, the virtual image may correspond to an image configured to provide such augmented reality information as information on a bus line, an allocation interval, or a position of the next bus.

Figure 1:
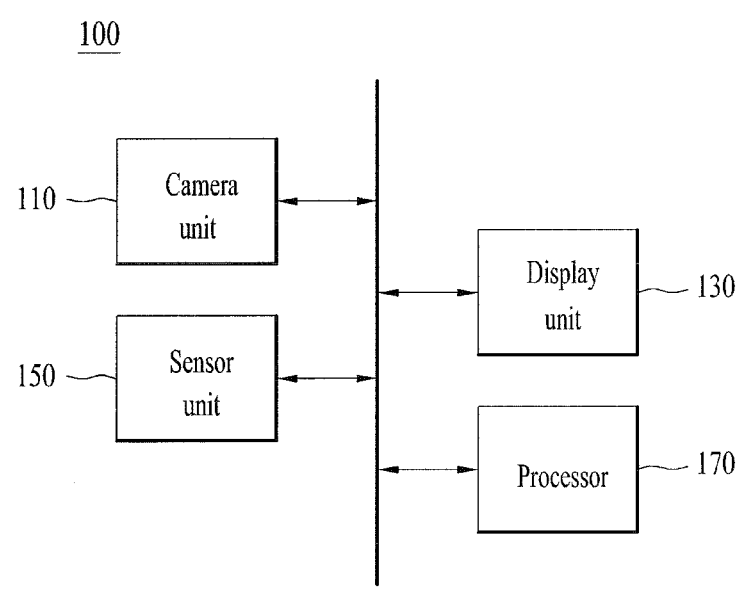
FIG. 1 is a block diagram of a portable device according to one embodiment.

FIG. 1 is a block diagram of a portable device according to one embodiment.

Referring to FIG. 1, the portable device 100 includes a camera unit 110, a display unit 130, a sensor unit 150, and a processor 170.

The camera unit 110 can capture an image in front of a device. More specifically, the camera unit 110 captures an image in front of a device within a viewing angle and can deliver the captured image to the processor 170. In this case, the viewing angle indicates an angle capable of taking an image via a lens of a camera. In this case, the captured image may correspond to a form of a picture, a video, a still frame. And, the captured image can include at least one marker object.

The display unit 130 can display a virtual image. More specifically, the display unit 130 can display a virtual image based on a control command of the processor 170.

The display unit 130 can be equipped with a non-transparent or a transparent display panel. In this case, the transparent display panel may include a translucent display panel. For instance, the non-transparent display panel may correspond to a liquid crystal display (LCD), a plasma display panel (PDP), a light-emitting diode display (LED), an organic light-emitting diode display (PLED), or the like. For instance, the transparent display panel may correspond to an optical see-through display panel.

The sensor unit 150 senses a user input or environment of a device using at least one sensing means installed in the device and can deliver a sensed result to the processor. The at least one sensing means may include such a sensing means as gravity sensor, a terrestrial magnetism sensor, a motion sensor, a gyroscope sensor, an acceleration sensor, an infrared sensor, a tilt (inclination) sensor, a brightness sensor, an altitude sensor, a smell sensor, a temperature sensor, a depth sensor, a pressure sensor, a bending sensor, an audio sensor, a video sensor, a GPS (global positioning system) sensor, a touch sensor, and the like. The aforementioned sensors may be included in the device as a separate element or may be included in the device in a manner of being combined to at least one element.

And, the sensor unit 150 detects a gaze of a user and can deliver a gaze location to the processor. In this case, the sensor unit 150 can detect a gaze direction of the user in response to a movement of pupils of the user. And, the sensor unit 150 can detect the gaze location based on a relative location of the pupils of the user for an HMD. The sensor unit 150 can deliver the detected gaze location to the processor.

And, the sensor unit 150 can detect whether a user is moving. And, the sensor unit 150 can detect a moving speed and a moving direction of a moving user. More specifically, the sensor unit 150 can detect a moving speed and a moving direction of the portable device 100 moved by a user. In particular, the sensor unit 150 can detect whether a user wearing the portable device 100 is moving. In this case, as an example, the sensor unit 150 can detect the moving speed and the moving direction of the user using the Doppler effect such as infrared, ultrasonic waves, laser, microwave and the like. In particular, the sensor unit 150 may correspond to a sensor detecting a moving speed and a moving direction of the portable device 100, by which the present specification may be non-limited.

And, the aforementioned sensor unit 150 can be configured by an independent element as an individual sensor unit. And, the aforementioned sensor unit 150 can be configured by a sensor hub in a manner of being integrated, by which the present specification may be non-limited.

A storage unit can store such a various digital data as a video, an audio, a picture, an application, and the like. The storage unit can be installed in the inside or the outside of the portable device 100. For instance, an internal storage unit can be installed in the inside of the portable device using a storing means such as a flash memory, a hard disk drive (HDD), a solid state drive (SSD). As a different example, an external storage unit can be installed in the outside of the portable device 100 using a server on the internet represented as a cloud. The external storage unit using the cloud can provide a data existing in a position physically different from each other in a manner of integrating the data with a virtualizing technique.

The communication unit can transceive a data with an external in a manner of performing a communication using various protocols. The communication unit accesses an external network by wired or wireless and can transceive a digital/analog data with the network.

The processor 170 executes various applications and can process a data of the internal of the device. And, the processor 170 controls each of the units of the aforementioned portable device 100 and can control data transmission/reception between units.

The processor of the present specification detects a marker object from a captured image and can display a virtual image corresponding to the detected marker object based on a position of the marker object. And, the processor detects a position change of the marker object, moves the virtual image according to the position change, and can obtain a first moving speed of the virtual image. And, when the first moving speed is faster than a first reference speed, the processor can slow down the first moving speed to make the first moving speed less than a first reference speed. Detailed explanation on the processor shall be described in the following description with reference to each drawing.

And, the processor can detect a moving speed and a moving direction of a user detected by the sensor unit. In this case, the processor can detect a change of a viewing angle of a camera unit based on a movement of a user. Having detected the change of the viewing angle of the camera unit, the processor can reduce a first moving speed to be less than a second reference speed, which is slower than a first reference speed. And, when detecting a marker object is ended, if a gaze location of a user is detected at a first location, the processor terminates a display of a virtual image based on a first terminate mode. If the gaze location of the user is detected at a second location, the processor can terminate a display of the virtual image based on a second terminate mode. In this case, detecting the marker object can be ended when the marker object is outside the viewing angle of the camera unit. In particular, if the marker object is outside the viewing angle of the camera unit, the processor can terminate the display of the virtual image. In this case, when the marker object is outside the camera unit, the processor can differently configure a method of displaying the virtual image based on the gaze location of the user.

First of all, FIG. 1 is a block diagram of a portable device 100 according to one embodiment. Blocks represented in a manner of being separated indicate the logically distinguished elements of the device. Hence, the elements of the aforementioned device can be equipped with a single chip or a plurality of chips according to the design of the device. And, the portable device 100 depicted in FIG. 1 is just one embodiment. All elements included in FIG. 1 are not necessary to perform embodiments of the present specification. In the following description, elements required for the embodiment of the present specification and operations of the elements are explained in detail.

Figure 2A:
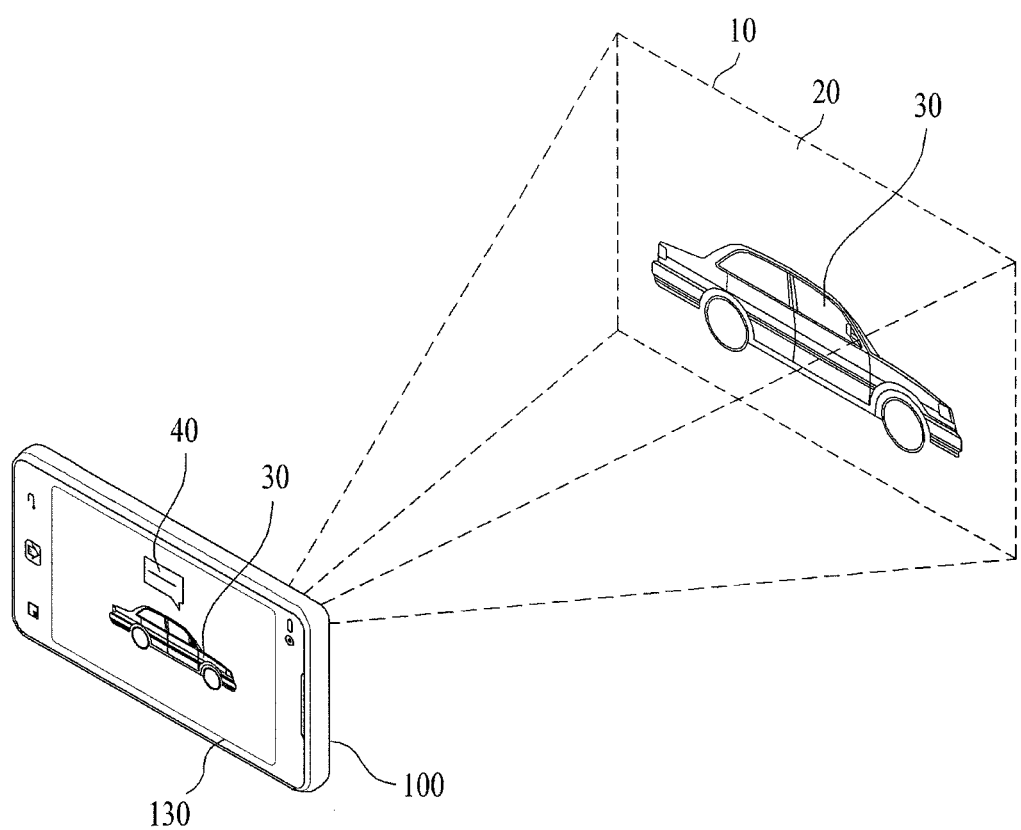
FIGS. 2A-2B are diagrams of a portable device capturing an image in front of a device and displaying a virtual image according to one embodiment.
Figure 2B:
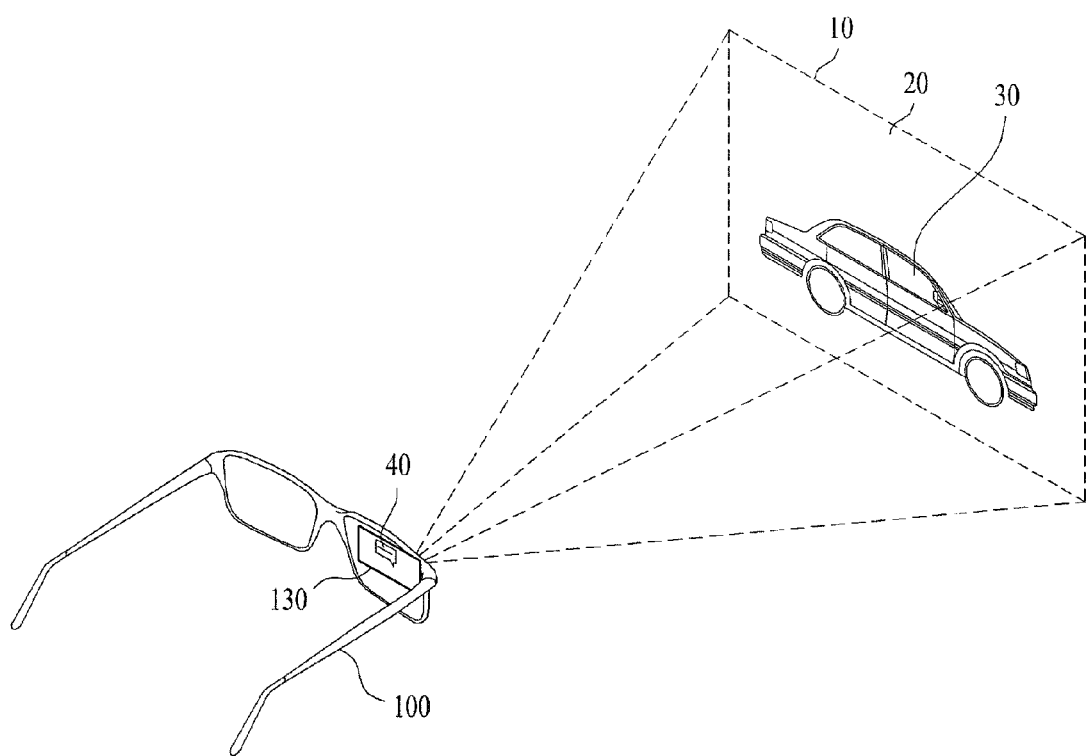

FIGS. 2A-2B are diagrams of a portable device capturing an image in front of the portable device and displaying a virtual image according to one embodiment.

FIG. 2A is an embodiment of the portable device including a display unit equipped with a non-transparent display panel and FIG. 2B is an embodiment of the portable device including a display unit equipped with a transparent display panel.

Referring to FIG. 2A and FIG. 2B, the portable device 100 can capture an image 20 in front of the device within an viewing angle 10 area using a camera unit. In this case, the camera unit can capture the image 20 in front of the device contiguously or with a specific time interval. For instance, the camera unit contiguously captures the image 20 in front of the device and can deliver the captured image 20 of a video form to the processor. As a different example, the camera unit captures the image 20 in front of the device with a specific time interval and can deliver the captured image 20 of a still frame form to the processor.

And, the portable device 100 can detect a marker object 30 using the processor. For instance, the processor detects the marker object 30 from the captured image 20 captured by the camera unit or can detect the marker objects 30 from a data corresponding to the image 20 displayed in the display unit. In this case, the processor can detect the marker object 30 in a manner of applying a pre-stored detecting algorithm.

And, the portable device 100 can obtain information (hereinafter also called virtual image information) on a virtual image 40 related to the marker object 30 using the processor. For instance, the processor directly obtains the virtual image information from an internal storage unit or can obtain the virtual image information from an external storage unit via the communication unit. In this case, the external storage unit can provide the virtual image information existing in a position physically different from each other to the portable device via a wired/wireless communication network in a manner of integrating the virtual image information with a virtualization technique.

In this case, the virtual image information can include at least one of augmented reality information related to the marker object, information on a display mode (display mode information), information on a graphic user interface format (graphic user interface format information).

In this case, the display mode is a mode to determine a quantity of the augmented reality information included in a display object. The display mode can be classified into a general display mode and a simple display mode. The general display mode is the display mode configured to include all augmented reality information included in the virtual image information in the display object. The simple display mode is the display mode configured to include selected augmented reality information in the display object only among the augmented reality information included in the virtual image information.

In this case, the graphic user interface format means a user interface format to display a virtual image in the display unit. The graphic user interface format according to one embodiment can include at least one of a display position, a display size, a display shape, a display color of the virtual image, or a display transparency of the virtual image.

And, the portable device 100 can display the virtual image 40 based on a position of the marker object 30 using the processor. For instance, as depicted in FIG. 2A, the processor can display the virtual image 40 in the top of the marker object 30 corresponding to the virtual image. As a different example, the processor can display the virtual image 40 in such various positions as the bottom, the left, the right, or the like of the marker object 30 corresponding to the virtual image 40. As a further different example, the processor can display the virtual image 40 in a manner of overlapping the marker object 30 corresponding to the virtual image with the virtual image 40.

As depicted in FIG. 2A, in case of a display unit 130 equipped with a non-transparent panel, the portable device 100 can display a captured image 20 and the virtual image 40 together. As depicted in FIG. 2B, in case of the display unit 130 equipped with a transparent display panel, the portable device 100 can display the virtual image 40 in a manner that the virtual image 40 overlaps a real environment of which a user sees without displaying the captured image 20.

Figure 3A:
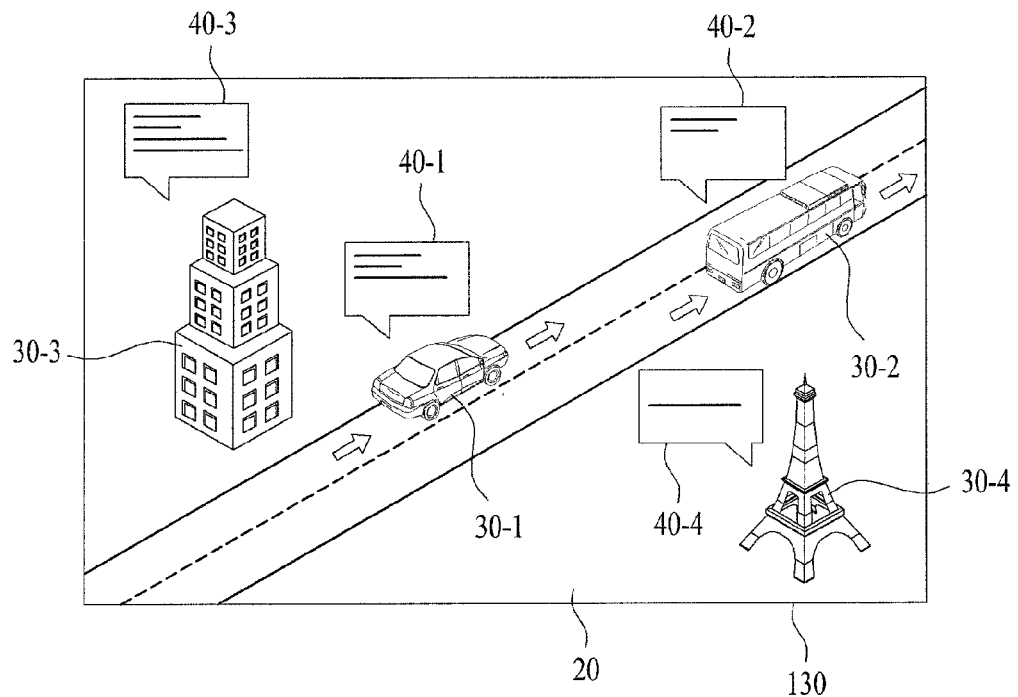
FIGS. 3A-3C are diagrams of a portable device displaying a virtual image for a plurality of detected marker images according to one embodiment.
Figure 3B:
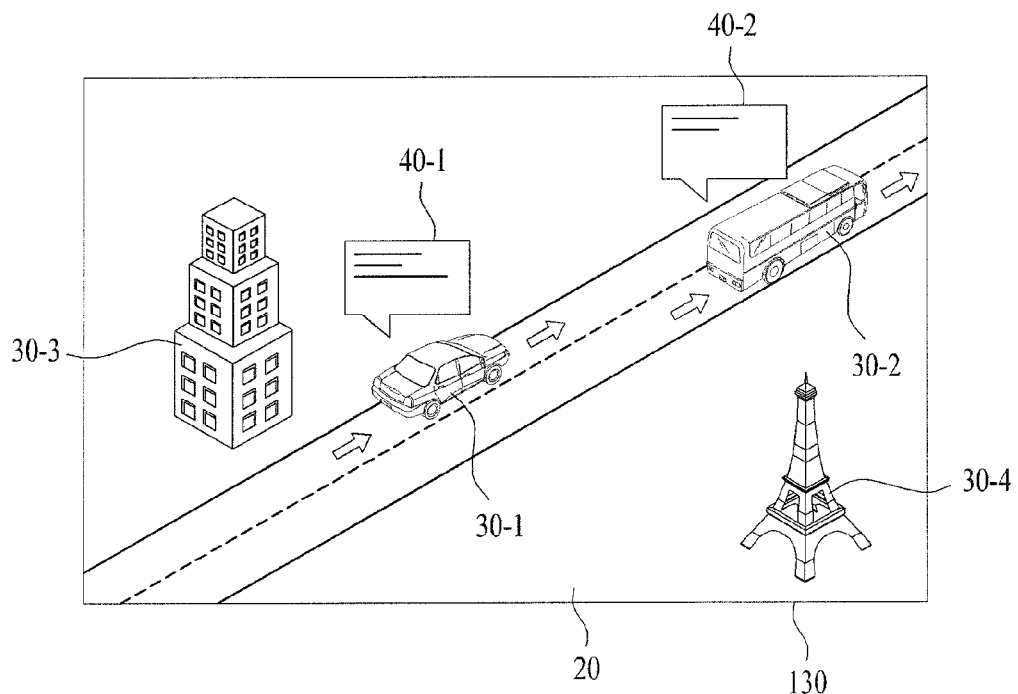
Figure 3C:
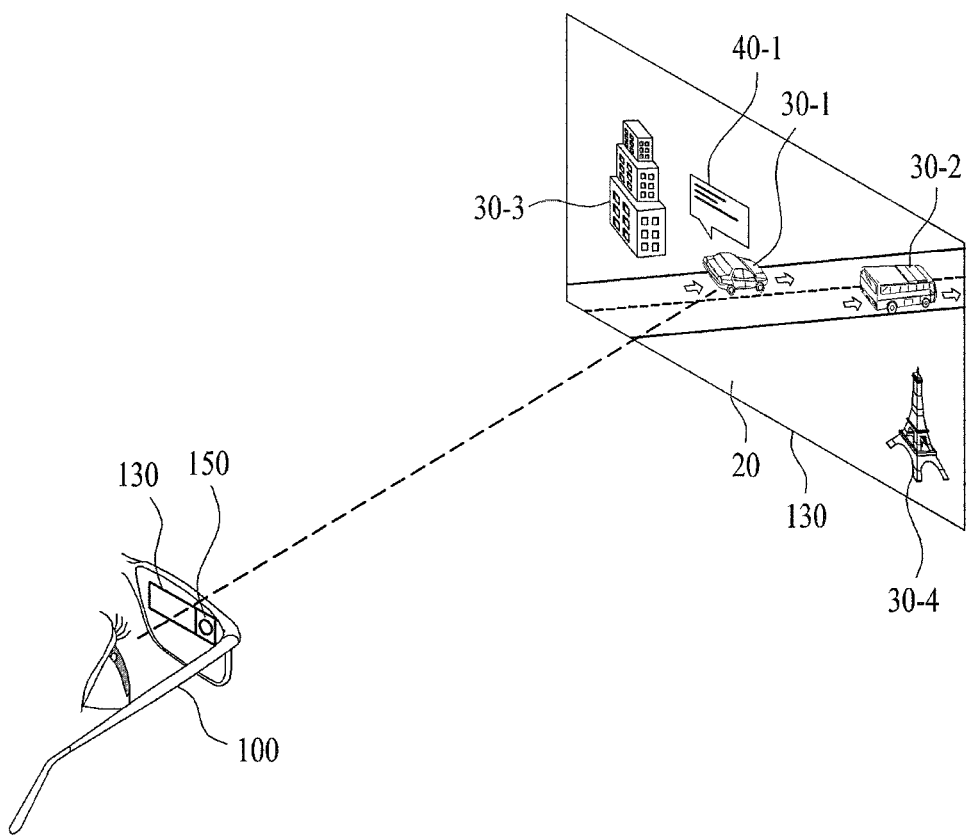

FIGS. 3A-3C are diagrams of a portable device displaying a virtual image for a plurality of detected marker images according to one embodiment.

More specifically, FIG. 3A is an embodiment of the portable device displaying a virtual image for all of a plurality of detected marker objects, FIG. 3B is an embodiment of the portable device displaying a virtual image for a selected marker object among a plurality of the detected marker objects, and FIG. 3C is an embodiment of the portable device displaying a virtual image for a marker object positioned at a user gaze among a plurality of the detected marker objects.

In FIG. 3A to FIG. 3C, since detail contents of obtaining the virtual image information and displaying the virtual image based on a position of a marker object are identical to the contents mentioned earlier in FIG. 2, detail contents are omitted.

First of all, referring to FIG. 3A, when a plurality of marker objects (30-1, 30-2, 30-3, and 30-4) are detected, the portable device can obtain virtual image information related to each of a plurality of the marker objects (30-1, 30-2, 30-3, and 30-4). The portable device can display each of virtual images (40-1, 40-2, 40-3, and 40-4) based on positions of the corresponding marker objects (30-1, 30-2, 30-3, and 30-4) using the obtained virtual image information.

Referring to FIG. 3B, when a plurality of the marker objects (30-1, 30-2, 30-3, and 30-4) are detected, the portable device selects specific marker objects (30-1 and 30-2) among a plurality of the marker objects (30-1, 30-2, 30-3, and 30-4) according to a predetermined selection condition and can obtain virtual image information related to the selected specific marker objects (30-1 and 30-2). In this case, the selection condition is a condition to select the specific marker object displaying a related virtual image. The selection condition may include information on an property and a type of a marker object. The selection condition may be a condition configured based on a user input. And, the selection condition may correspond to a condition stored in advance in the portable device.

For instance, as depicted in FIG. 3B, if mobility of a marker object is configured as the selection condition, the portable device selects specific marker objects (30-1 and 30-2) having mobility among a plurality of the marker objects (30-1, 30-2, 30-3, and 30-4) and can obtain virtual image information related to the selected specific marker objects (30-1 and 30-2). And, the portable device can display each of the virtual images (40-1 and 40-2) based on the positions of the corresponding specific marker objects (30-1 and 30-2) using the obtained virtual image information.

Referring to FIG. 3C, in case that a plurality of the marker objects (30-1, 30-2, 30-3, and 30-4) are detected, the portable device senses a user gaze using the sensor unit 150 and can detect a gaze location where the user's gaze is on, and can select at least one marker object from the plurality of marker objects (30-1, 30-2, 30-3, and 30-4) based on the gaze location.

For instance, as depicted in FIG. 3C, the portable device can select one marker object (30-1) positioned at the sensed gaze location or positioned at an area adjacent to the sensed gaze location from a plurality of the detected marker objects (30-1, 30-2, 30-3, and 30-4). And, the portable device obtains virtual image information on the selected marker objects (30-1) and can display a virtual image (40-1) based on a position of the selected marker object (30-1) using the obtained virtual image information.

As a different example, the portable device can select a plurality of marker objects (30-1 and 30-3) positioned within a predetermined distance from the sensed gaze location from a plurality of detected marker objects (30-1, 30-2, 30-3, and 30-4). And, the portable device obtains virtual image information on the selected marker objects (30-1 and 30-3) and can display each of virtual images (40-1 and 40-3) based on the positions of the selected marker objects (30-1 and 30-3) using the obtained virtual image information.

Figure 4A:
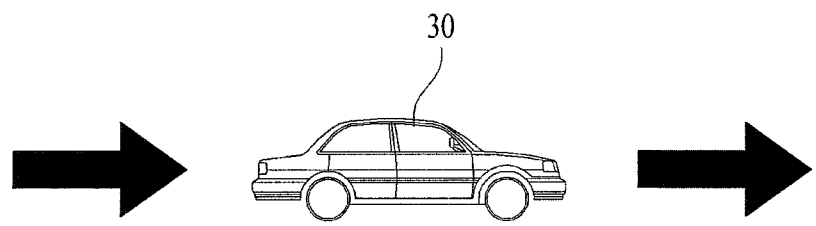
FIGS. 4A-4B are diagrams of a case that a position change of a marker object is detected according to one embodiment.
Figure 4A:
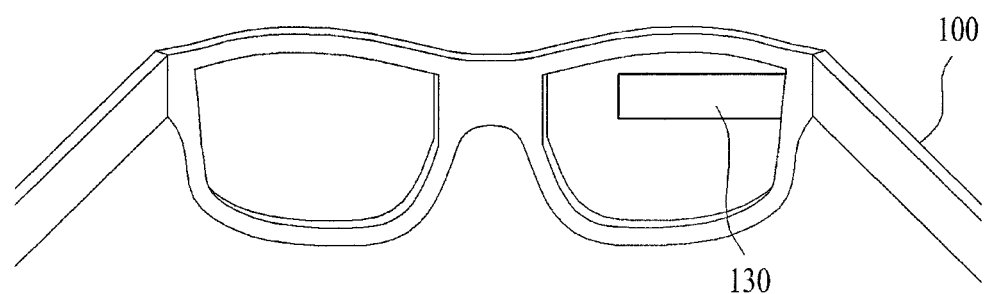
Figure 4B:
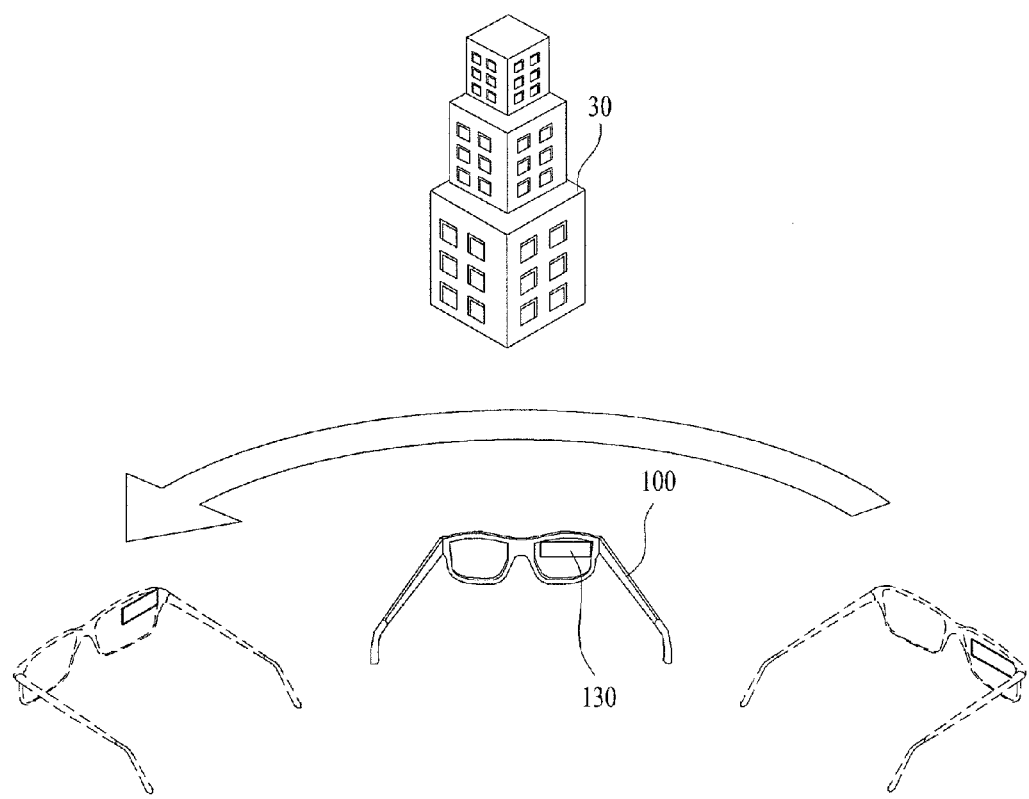

FIGS. 4A-4B are diagrams of a case that a position change of a marker object is detected according to one embodiment. The position change of the marker can occur due to an absolute position change of the marker object or a relative position change between the portable device and the marker object.

FIG. 4A is an embodiment for the absolute position change of the marker object and FIG. 4B is an embodiment for the relative position change of the marker object. In this case, the processor can detect the position change of the marker object 30 in a manner of applying a pre-stored detecting algorithm or a tracking algorithm. And, the portable device can sense a position and a direction of the marker object using the sensor unit. The portable device can determine whether the position change corresponds to the absolute position change or the relative position change using a sensed result and can perform a data processing that corresponds to each case.

Referring to FIG. 4A, since the marker object 30 is moving and the portable device 100 is at a standstill, the portable device 100 can detect the absolute position change of the marker object 30.

For instance, the portable device 100 can detect the absolute position change of the marker object 30 from an image captured by the camera unit using the processor. As a different example, the portable device 100 can detect the absolute position change of the marker object 30 from a data corresponding to an image displayed in the display unit 130 using the processor. In this case, the marker object 30 may correspond to such a movable object as a bus, a subway, and the like.

Referring to FIG. 4B, since the marker object 30 is at a standstill and the portable device 100 is moving, the portable device 100 can detect the relative position change of the marker object 30.

For instance, the portable device 100 can detect the relative position change of the marker object 30 from an image captured by the camera unit using the processor. As a different example, the portable device can detect the relative position change of the marker object 30 from a data corresponding to an image displayed in the display unit 130 using the processor. In this case, the marker object 30 may correspond to such an object fixed on a GPS as a building, a bus stop information board, and the like.

In this case, the portable device 100 can be moved based on a user carrying the device or the user wearing the device. And, the portable device can be moved based on a movement of such a means of transportation as a bus and the like on which the user carrying the device or the user wearing the device is getting.

As mentioned in the foregoing description, when a position change of the marker object 30 is detected, the portable device 100 moves a virtual image 40 according to the position change of the marker object 30 and can obtain a moving speed (also called a first moving speed) of the virtual image 40 using the processor. In this case, the processor can obtain the moving speed of the virtual image 40 from an image displayed in the display unit 130.

And, the processor can further obtain a moving speed (also called a second moving speed) of the marker object 30. In this case, the processor can obtain the moving speed of the marker object 30 from the image captured by the camera unit or the image displayed in the display unit 130. In this case, the processor may obtain the moving speed of the marker object 30 only when the absolute position change of the marker object 30 is detected.

And, when the position change of the marker object is detected, the processor can further obtain acceleration (also called a first moving acceleration) of a virtual image or acceleration of a marker object (also called a second moving acceleration).

FIGS. 5A-5D are diagrams of a portable device displaying a virtual image in accordance with a moving speed of the virtual image according to one embodiment. FIG. 5 shows virtual images displayed in the display unit on each time (t1, t2, t3, and t4) and an interval between each of the times (t1, t2, t3, and t4) is identical to each other.

Figure 5A:
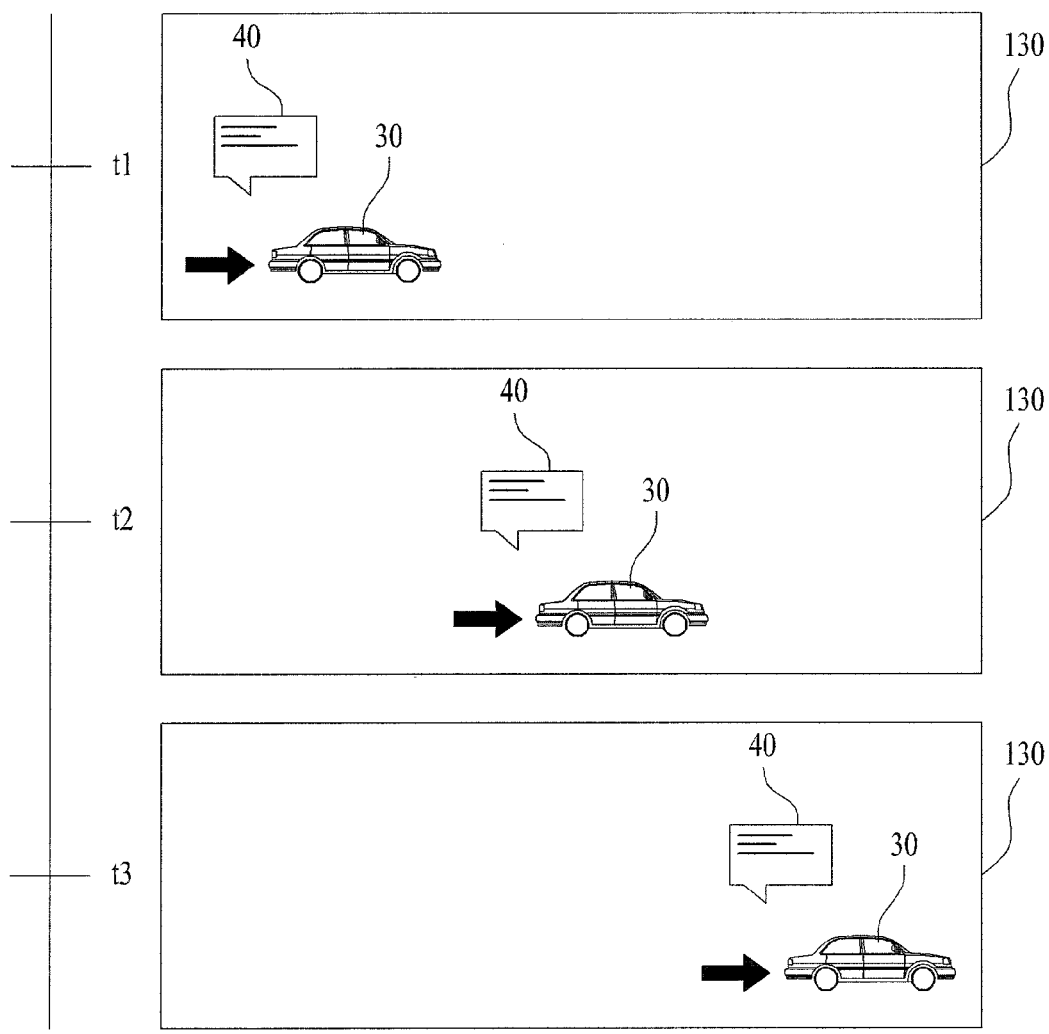

FIG. 5A is an embodiment of the portable device displaying a virtual image when a moving speed of the virtual image is slower than a first reference speed, FIG. 5B is an embodiment of the portable device displaying a virtual image when a moving speed of the virtual image is faster than the first reference speed and slower than a second reference speed, FIG. 5C is an embodiment of the portable device displaying a virtual image when a moving speed of the virtual image is faster than the second reference speed, and FIG. 5D is an embodiment of the portable device displaying a virtual image when a moving speed of the virtual image is faster than the first reference speed but acceleration of the virtual image is negative acceleration.

Referring to FIG. 5A, the moving speed of the virtual image 40 on each time (t1, t2, and t3) is slower than the first reference speed. In this case, the portable device moves the virtual image 40 according to a position change of a marker object 30. The portable device can continuously display the virtual image 40 in a position adjacent to the marker object 30.

In this case, the first reference speed is a predetermined speed and indicates a minimum speed required to read a moving virtual image. In particular, if the moving speed of the virtual image 40 is slower than the first reference speed, a user can sufficiently read the virtual image 40. Yet, if the moving speed of the virtual image 40 is faster than the first reference speed, the user cannot sufficiently read the virtual image 40.

The first reference speed can be configured based on at least one of a size ratio of a display area and a virtual image, quantity of augmented reality information included in a virtual image, or resolution of a display unit. For instance, the bigger the size of the display area compared to the size of the display unit, the less quantity of the augmented reality information included in the virtual image, and the higher the resolution of the display unit, the greater the first reference speed value increases. The first reference speed can be set to various values according to a user configuration and can be set with various ways.

Referring to FIG. 5B, the moving speed of the virtual image 40 on each time (t1, t2, and t3) is faster than the first reference speed and slower than the second reference speed. In this case, the portable device can lower the moving speed of the virtual image 40 to less than the first reference speed. And, when the moving speed of the virtual image 40 is lowered less than the first reference speed, the portable device changes a graphic user interface format and can display the virtual image in accordance with the changed graphic user interface. Regarding this, it shall be described in detail in FIG. 7.

In this case, the second reference speed is a predetermined speed and indicates a maximum speed required to read a moving virtual image 40. In particular, if the moving speed of the virtual image 40 is faster than the second reference speed, it is impossible or unnecessary for a user to sufficiently read the virtual image 40. Hence, the portable device can stop displaying the virtual image 40. The second reference speed is faster than the first reference speed.

The second reference speed can be configured based on at least one of a size ratio of a display area and a virtual image, quantity of augmented reality information included in a virtual image, or resolution of a display unit. For instance, the bigger the size of the display area compared to the size of the display unit, the less quantity of the augmented reality information included in the virtual image, and the higher the resolution of the display unit, the greater the second reference speed value increases. The second reference speed can be set to various values according to a user configuration and can be set with various ways.

Referring to FIG. 5C, the moving speed of the virtual image 40 on each time (t1, t2, and t3) is faster than the second reference speed. In this case, it is impossible or unnecessary for a user to sufficiently read the virtual image 40. Hence, the portable device can stop displaying the virtual image 40. In this case, the portable device can stop displaying the virtual image in a manner of gradually fading out the virtual image.

FIG. 5A to FIG. 5C depicts a case that the moving speed of the virtual image is a constant speed, by which the present specification may be non-limited. The moving speed of the virtual image 40 can continuously change. Hence, the portable device can obtain the moving speed of the virtual image 40 in real time and can perform the aforementioned data processing according to the moving speed in real time. And, the portable device obtains the moving speed of the virtual image 40 with a predetermined time interval and can perform the aforementioned data processing according to the moving speed with the predetermined time interval.

Although FIG. 5A to FIG. 5C is explained based on the moving speed of the virtual image 40, if the moving speed of the marker object 30 is obtained, an identical explanation can be applied as well. In particular, if the moving speed of the marker object 30 is slower than the first reference speed, the portable device moves the virtual image 40 in accordance with a position change of the marker object 30 and can continuously display the virtual image 40 in a position adjacent to the marker object 30. And, if the moving speed of the marker object 30 is faster than the first reference speed and slower than the second reference speed, the portable device can lower the moving speed of the virtual image 40 less than the first reference speed. And, if the moving speed of the marker object 30 is faster than the second reference speed, the portable device can stop displaying the virtual image 40.

Referring to FIG. 5D, the moving speed of the virtual image 40 on each time (t1 and t2) is faster than the first reference speed, moving acceleration of the virtual image 40 on a time (t2) is negative acceleration, and the moving speed of the virtual image 40 on each time (t3 and t4) is slower than the first reference speed.

If the moving speed of the virtual image 40 is faster than the first reference speed and the moving acceleration of the virtual image 40 is negative acceleration as shown on the time (t2), the portable device determines whether the moving speed of the virtual image is lowered less than the first reference speed based on a magnitude of the acceleration and can display the virtual image 40 according to the determined result. For instance, when the moving acceleration of the virtual image 40 is negative acceleration, which is greater than a predetermined magnitude, since the moving speed of the virtual image will become slower than the first reference speed in a short time although the moving speed of the virtual image 40 on a current timing point is faster than the first reference speed, the portable device may not lower the moving speed of the virtual image 40.

In this case, the predetermined magnitude can be configured based on at least one of a size ratio of a display area and a virtual image, quantity of augmented reality information included in a virtual image, or resolution of a display unit. The predetermined size can be set to various values according to a user configuration and can be set with various ways.

Unlike FIG. 5D, the moving speed of the virtual image 40 and the moving acceleration of the virtual image 40 can continuously change. Hence, the portable device obtains the moving speed of the virtual image 40 and the moving acceleration of the virtual image 40 in real time and can perform the aforementioned data processing according to the moving speed and the moving acceleration in real time. And, the portable device obtains the moving speed of the virtual image 40 and the moving acceleration of the virtual image 40 with a predetermined time interval and can perform the aforementioned data processing according to the moving speed of the virtual image 40 and the moving acceleration of the virtual image 40 with the predetermined time interval.

Although FIG. 5D is explained based on the moving speed of the virtual image 40 and the moving acceleration of the virtual image 40, if the moving speed of the marker object 30 and the moving acceleration of the marker object 30 are obtained, an identical explanation can be applied as well. In particular, if the moving speed of the marker object 30 is faster than the first reference speed and the moving acceleration of the marker object 30 is negative acceleration, the portable device determines whether the moving speed of the virtual image 30 is lowered less than the first reference speed based on a magnitude of the acceleration and can display the virtual image 40 according to the determined result. For instance, if the moving acceleration of the marker object 30 has negative acceleration, which is greater than a predetermined magnitude, since the moving speed of the virtual image will become slower than the first reference speed in a short time although the moving speed of the virtual image 40 on a current timing point is faster than the first reference speed, the portable device may not lower the moving speed of the virtual image 40.

Figure 6A:
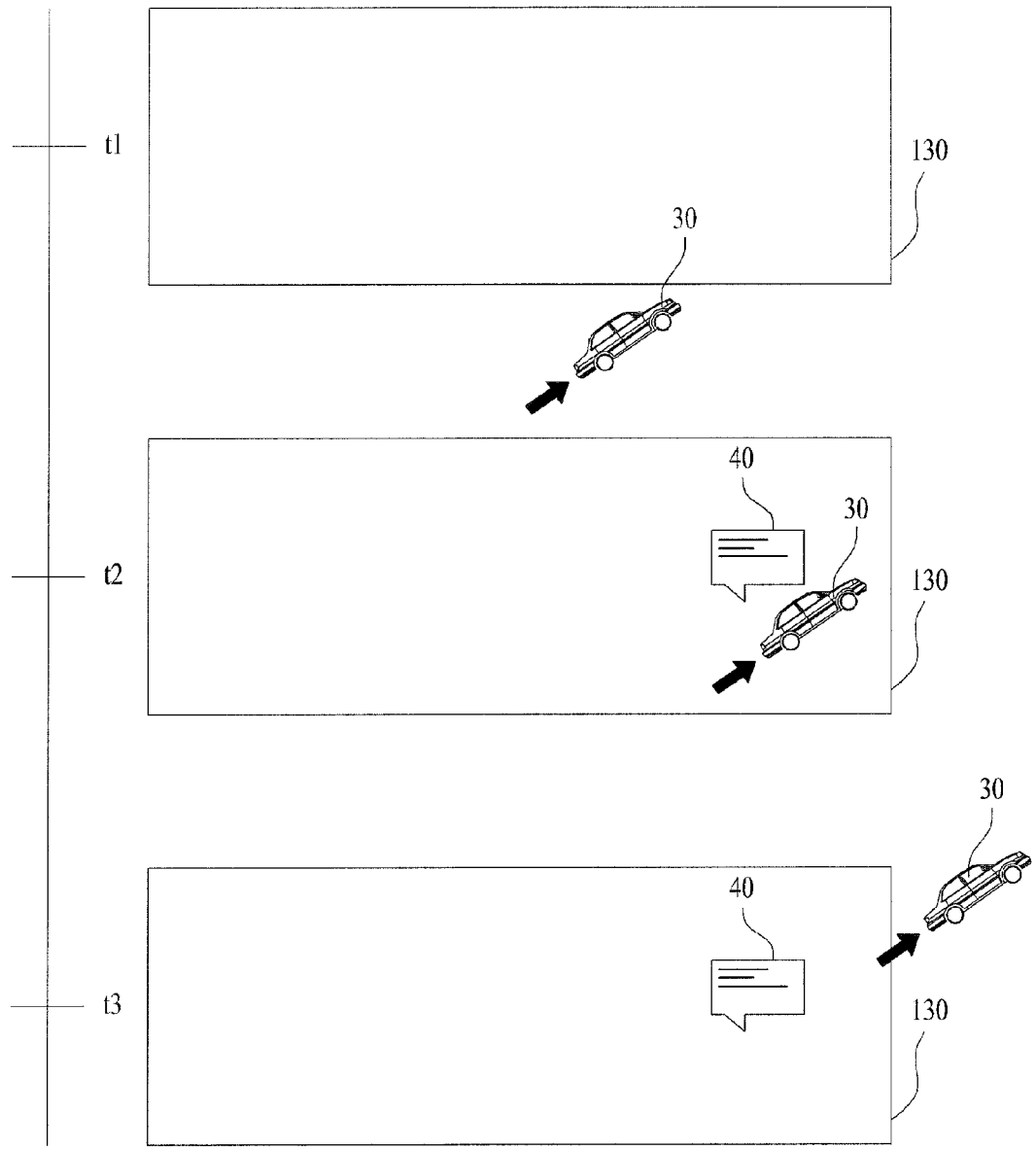
FIGS. 6A-6B are diagrams of a portable device displaying a virtual image in accordance with duration of which the marker object is detected or a size of which the marker object is detected according to one embodiment.
Figure 6B:
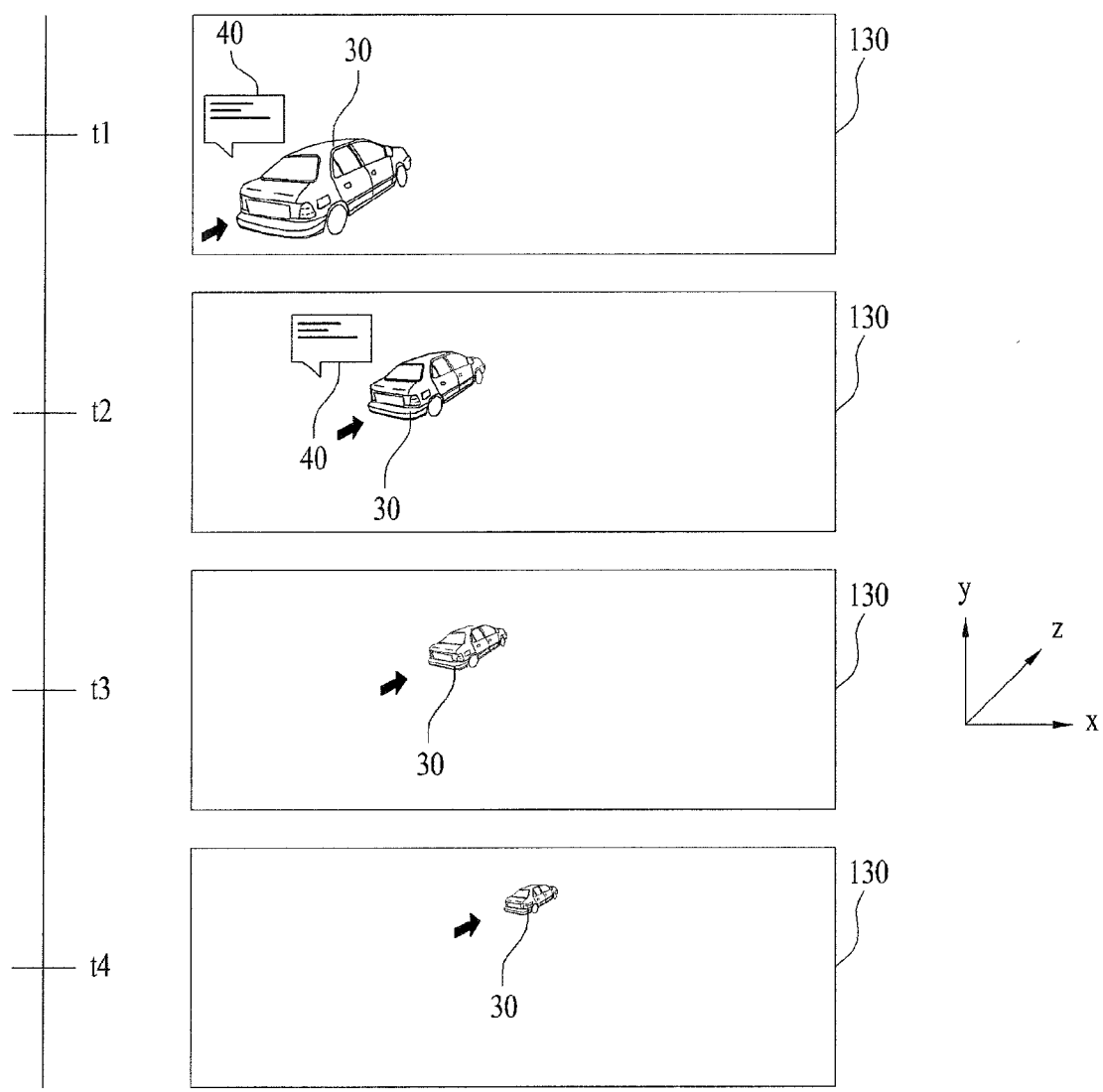

FIGS. 6A-6B are diagrams of a portable device displaying a virtual image in accordance with duration of which the marker object is detected or a size of which the marker object is detected according to one embodiment. FIG. 6 shows a virtual image displayed in the display unit on each time (t1, t2, and t3) and an interval between each of the times is identical to each other.

FIG. 6A is an embodiment of the portable device displaying a virtual image when the marker object is no longer detected and the duration is shorter than predetermined duration and FIG. 6B is an embodiment of the portable device displaying a virtual image when the size is smaller than a predetermined size.

Referring to FIG. 6A, although the moving speed of the virtual image 40 or the moving speed of the marker object 30 on each time (t1, t2, and t3) is slower than the first reference speed, the marker object is no longer detected and the duration is shorter than predetermined duration. In this case, the portable device can further display the virtual image 40 for a predetermined period after the marker object is no longer detected. In this case, the predetermined period can be set to various values according to a user configuration and can be set with various ways.

According to one embodiment, the portable device can display the virtual image 40 as a static state in a position where the detecting of the marker object 30 is ended for a predetermined period after a time (t2) on which the detecting of the marker object 30 is ended as shown on time (t3). According to a different embodiment, the portable device changes a graphic user interface and can display the virtual image 40 in accordance with the changed graphic user interface. Regarding this, it shall be described in detail in FIG. 7.

In this case, the predetermined duration indicates a minimum duration required to sufficiently read a moving virtual image. In particular, although the moving speed of the virtual image 40 is slower than the first reference speed, if the duration is shorter than the predetermined duration, a user cannot sufficiently read the virtual image.

The predetermined duration can be configured based on at least one of a size ratio of a viewing angle area and a marker object, quantity of augmented reality information included in a virtual image, or resolution of a display unit. For instance, the bigger the size of the viewing angle area compared to the size of the display unit, the less quantity of the augmented reality information included in the virtual image, and the higher the resolution of the display unit, the greater the predetermined duration value increases. The predetermined duration can be set to various values according to a user configuration and can be set with various ways.

Referring to FIG. 6B, although the moving speed of the virtual image 40 or the moving speed of the marker image 30 is slower than the first reference speed on each time (t1, t2, t3, and t4), the size of the marker object 30 is smaller than the predetermined size. In this case, the portable device can stop displaying the virtual image 40.

In this case, the predetermined size indicates a minimum size required to display a virtual image. In particular, although the moving speed of the virtual image 40 is slower than the first reference speed, if the size of the marker object 30 is smaller than the predetermined size, it may correspond to a case that the marker object 30 is apart from a vision of a user as far as not necessary to display the virtual image 40 for the detected marker object 30.

The predetermined size can be configured based on at least one of a viewing angle area and a marker object, quantity of augmented reality information included in a virtual image, or resolution of a display unit. For instance, the bigger the size of the viewing angle area compared to the size of the display unit, the less quantity of the augmented reality information included in the virtual image, and the higher the resolution of the display unit, the greater the predetermined size value increases. The predetermined size can be set to various values according to a user configuration and can be set with various ways.

Although it is assumed that the moving speed of the virtual image 40 or the moving speed of the marker object 30 is slower than the first reference speed in FIG. 6A and FIG. 6B, in case that the moving speed of the virtual image 40 is faster than the first reference speed, an identical explanation can be applied as well.

FIGS. 7A-7D are diagrams of a portable device displaying a virtual image with a changed displaying method in case of lowering a moving speed of the virtual image according to one embodiment.

Figure 7A:
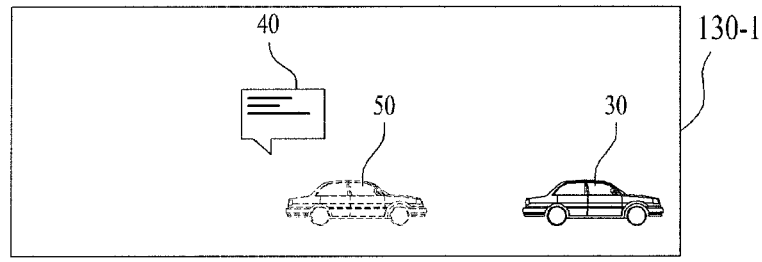
FIGS. 7A-7D are diagrams of a portable device displaying a virtual image with a changed displaying method in case of lowering a moving speed of the virtual image according to one embodiment.

Referring to FIG. 7A, when the moving speed of the virtual image 40 is lowered less than the first reference speed, the portable device obtains a virtual marker object 50 corresponding to the marker object 30 using the processor. The portable device can display the obtained virtual marker object 50 in the display unit 130-1 together with the virtual image 40.

In this case, the portable device can obtain the virtual marker object 50 from an internal storage unit or an external storage unit. In this case, the virtual marker object 50 means a virtual object corresponding to the marker object 30. In this case, a shape, a color, transparency, a position, and the like of the virtual marker object can be variously set according to such various methods as a user input, a pre-stored method, and the like.

As mentioned in the foregoing description, when the portable device displays the virtual marker object 50 together with the virtual image 40, although the marker object 30 deviates from a vision of a user, the portable device can inform the user of the marker object 30 corresponding to the virtual image 40.

And, the portable device can further display an indicator indicating a connection between the virtual marker object and the corresponding marker object.

Figure 7B:
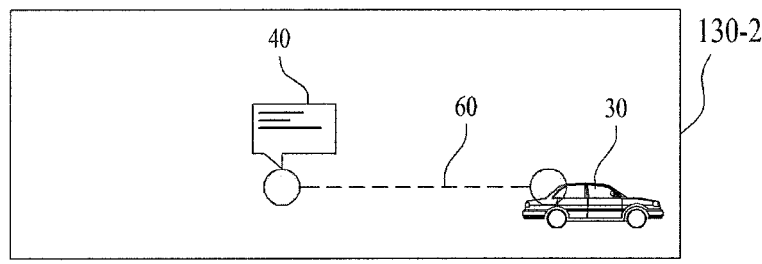

Referring to FIG. 7B, when the moving speed of the virtual image 40 is lowered less than the first reference speed, the portable device can further display the indicator 60 indicating the connection between the virtual image 40 and the corresponding marker object 30 in the display unit 130-2 using the processor. In this case, a shape, a color, a position, and the like of the indicator can be variously set according to such various methods as a user input, a pre-stored method, and the like.

As mentioned earlier, in case that the portable device further displays the indicator 60, although a position of the marker object 30 is far away from a position of the virtual image 40, the portable device can inform a user of the marker object 30 corresponding to the virtual image 40.

Figure 7C:
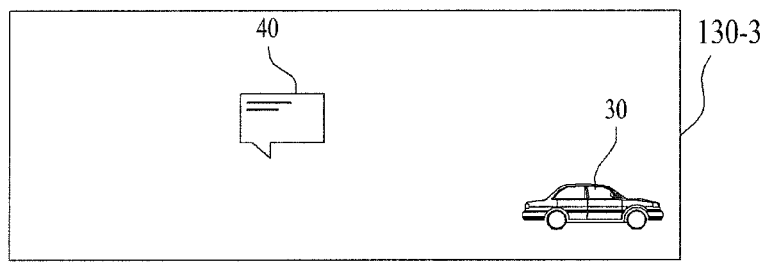

Referring to FIG. 7C, when the moving speed of the virtual image 40 is lowered less than the first reference speed, the portable device can display the virtual image 40 in a simple display mode in the display unit 130-3 using the processor. In this case, as mentioned earlier, the simple display mode is a display mode configured to include a part of selected augmented reality information in a display object only among the augmented reality informations related to the marker object included in the virtual image.

In this case, the processor can select a part of the augmented reality information only among the augmented reality informations according to a predefined priority. For instance, if the augmented reality information includes a bus line, a position of a next bus, information on an allocation interval and a priority is determined in an order of the bus line, the position of the next bus, and the allocation interval, the processor can display the augmented reality information in a manner of selecting only the augmented reality information on the bus line having a first priority and on the position of the next bus having a second priority. In this case, the priority can be variously set according to such various methods as a user input, a predetermined method, and the like.

As mentioned earlier, in case that the portable device displays a virtual image including less quantity of augmented reality information, although a moving speed of the virtual image is fast, the portable device can enhance the readability of a user for the virtual image.

Figure 7D:
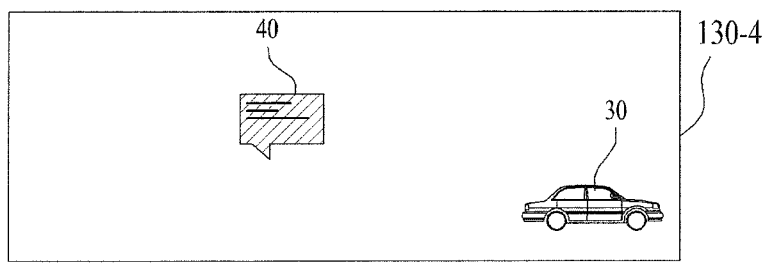

Referring to FIG. 7D, when the moving speed is lowered less than the first reference speed, the processor changes a graphic user interface format and can display a virtual image 40 in the display unit 130-4 in accordance with the changed graphic user interface format. Although FIG. 7D depicts the virtual image 40 displaying the virtual image 40 in a manner of changing its graphic user interface format for a displayed color of the virtual image, as mentioned earlier, the graphic user interface format can include a display position, a display size, a display color, or a configuration value for transparency of the virtual image 40. In this case, the graphic user interface format can be variously set according to such various methods as a user input, a pre-stored method, and the like.

In case that the portable device displays a virtual image by such a scheme of reducing a size of the virtual image and the like in a manner of changing the graphic user interface format, although a moving speed of the virtual image is fast, the portable device can enhance the readability of a user for the virtual image.

Although FIG. 7 depicts embodiments for a case of lowering the moving speed of the virtual image, by which the present specification may be non-limited. In case that the virtual image is displayed as a static state, the identical embodiment can be applied as well.

Figure 8:
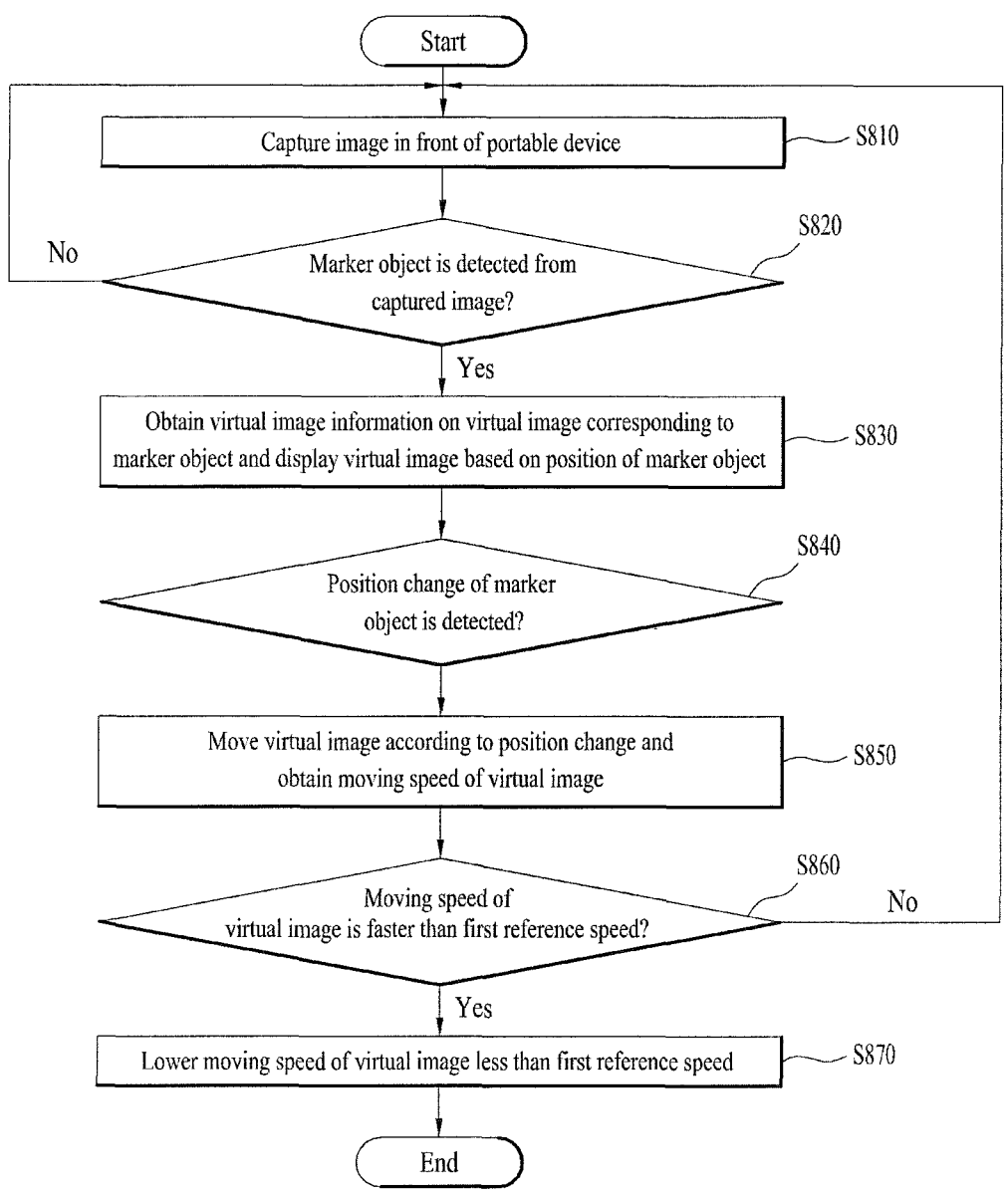
FIG. 8 is a flowchart of a method of controlling a portable device according to one embodiment.

FIG. 8 is a flowchart of a method of controlling a portable device according to one embodiment.

First of all, the portable device can capture an image in front of a device [S810]. As mentioned earlier in FIG. 2, the portable device captures the image in front of the device within a viewing angle via a camera unit and can deliver the captured image to a processor. In this case, the camera unit can capture the image in front of the device contiguously or with a specific time interval.

And, the portable device can detect a marker object from the captured image [S820].

As mentioned earlier in FIG. 2, the portable device can detect the marker object from the image captured by the camera unit. And, the portable device can detect the marker object from a data corresponding to the image displayed in a display unit.

And, in case that the marker object is detected, the portable device obtains a virtual image information on a virtual image related to the marker object and can display the virtual image based on a position of the marker object [S830].

As mentioned earlier in FIG. 2, the portable device can obtain the virtual image information from an internal storage unit or an external storage unit. In this case, the virtual image information can include at least one of augmented reality information related to the marker object, information on a display mode, or information on a graphic user interface format. Detailed contents are described in the foregoing description. As mentioned earlier in FIG. 3, the portable device obtains a virtual image for a selected marker object or a specific marker object positioned at a gaze location of a user and can display the virtual image corresponding to the specific marker object only.

And, the portable device can detect a position change of the marker object from the captured image [S840]. As mentioned earlier in FIG. 4, the portable device can detect an absolute position change of the marker object or a relative position change between the device and the marker object from the image captured by the camera unit or the data corresponding to the image displayed in the display unit. And, the portable device senses a position and a direction of the marker object using a sensor unit. The portable device can judge in a manner of distinguishing the absolute position change of the marker object from the relative position change of the marker object using a sensed result and can perform a data processing corresponding to each case.

And, when the position change of the marker object is detected, the portable device moves the virtual image according to the position change and can obtain a moving speed of the virtual image [S850].

As mentioned earlier in FIG. 5, the portable device moves the virtual image according to the position change of the marker object and can continuously display the virtual image in a position adjacent to the marker object. And, the portable device can further obtain the moving speed of the marker object. Moreover, the portable device can further obtain acceleration of the virtual image and acceleration of the marker object.

And, the portable device 100 determine whether the moving speed of the virtual image is faster than a first reference speed [S860].

As mentioned earlier in FIG. 5, the portable device can determine whether the moving speed of the virtual image is faster than a second reference speed. And, the portable device can determine whether the moving speed of the marker object is faster than the first reference speed or the second reference speed. In this case, the first reference speed is a predetermined speed. The first reference speed indicates a minimum speed required to read a moving virtual image. The second reference speed is a predetermined speed. The second reference speed indicates a maximum speed required to read a moving virtual image 40. The second reference speed is faster than the first reference speed. Detailed contents are described in the foregoing description.

And, when the moving speed of the virtual image is faster than the first reference speed, the portable device 100 can lower the moving speed of the virtual image less than the first reference speed.

Regarding this, it is identical to the contents described in FIG. 6. As mentioned earlier in FIG. 7, when the moving speed of the virtual image is lowered, the portable device can further display a virtual marker object or an indicator. And, when moving speed of the virtual image is lowered, the portable device can change the display mode or the graphic user interface format and display the virtual image in accordance with the changed display mode or the changed graphic user interface format. By using the aforementioned display method, readability of a user for the virtual image can be enhanced.

Figure 9:
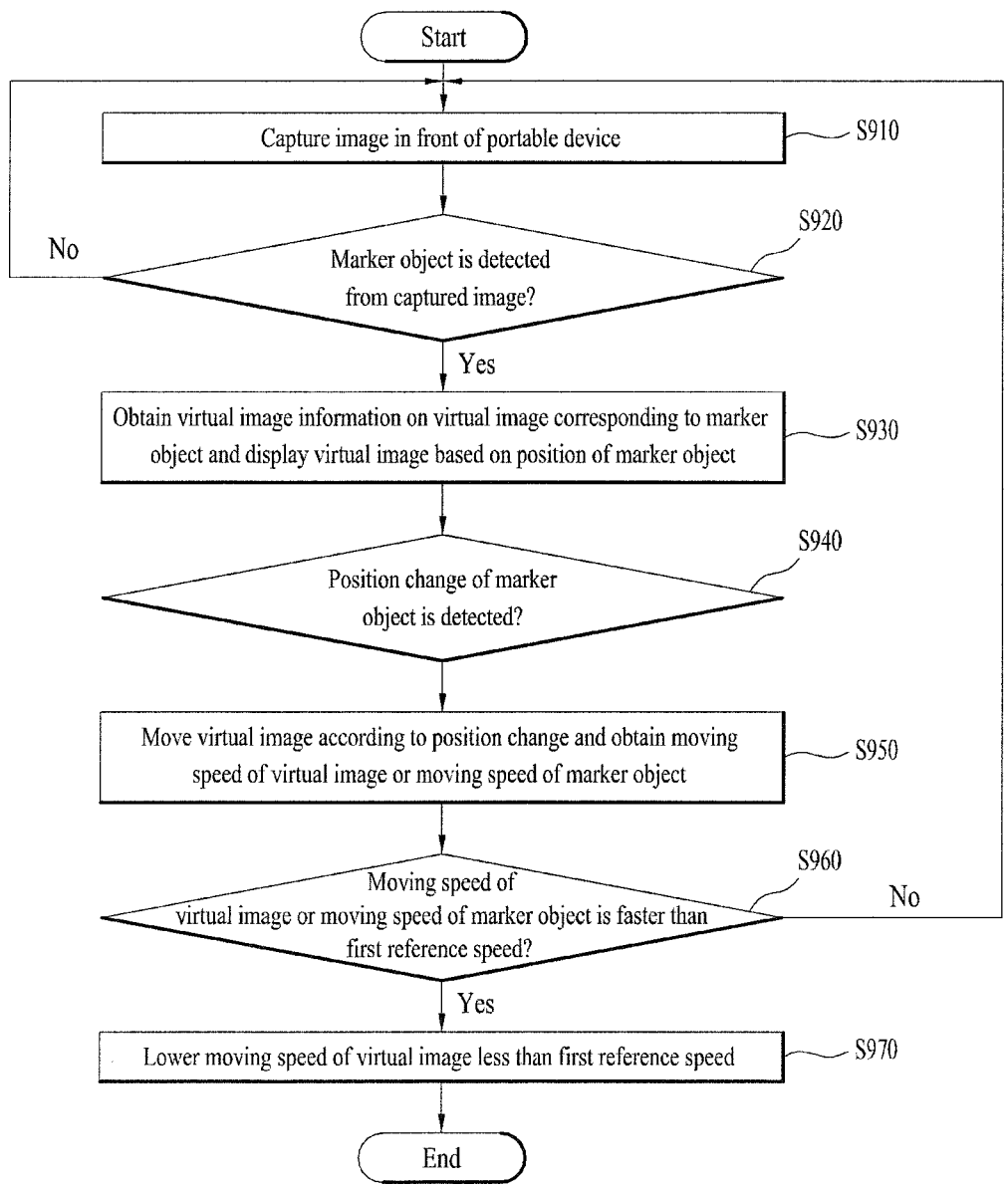
FIG. 9 is a flowchart of a method of controlling a portable device according to a different embodiment.

FIG. 9 is a flowchart of a method of controlling a portable device according to a different embodiment.

First of all, the portable device can capture an image in front of a device [S910]. And, the portable device can detect a marker object from the captured image [S920]. And, in case that the marker object is detected, the portable device obtains virtual image information on a virtual image related to the marker object and can display the virtual image based on a position of the marker object [S930]. And, the portable device can detect a position change of the marker object from the captured image [S940]. Explanation on S910 to S940 is omitted since it is identical to the contents of S810 to S840 mentioned earlier in FIG. 8.

And, when the position change of the marker object is detected, the portable device moves the virtual image according to the position change and can obtain a moving speed of the virtual image or a moving speed of the marker object [S950]. In particular, as mentioned earlier in FIG. 5, the portable device moves the virtual image according to the position change of the marker object and can continuously display the virtual image in a position adjacent to the marker object. And, the portable device can obtain the moving speed of the virtual image or the moving speed of the marker object. Moreover, the portable device can further obtain acceleration of the virtual image or acceleration of the marker object.

And, the portable device 100 can determine whether the moving speed of the virtual image or the moving speed of the marker object is faster than a first reference speed [S960]. Moreover, as mentioned earlier in FIG. 5, the portable device can determine whether the moving speed of the virtual image or the moving speed of the marker object is faster than a second reference speed. In this case, the first reference speed is a predetermined speed. The first reference speed indicates a minimum speed required to read a moving virtual image. The second reference speed is a predetermined speed. The second reference speed indicates a maximum speed required to read a moving virtual image 40. Detailed contents are described in the foregoing description.

And, when the moving speed of the virtual image or the moving speed of the marker object is faster than the first reference speed, the portable device can lower the moving speed of the virtual image less than the first reference speed [S970]. Regarding this, it is identical to the contents described in FIG. 8.

Figure 10A:
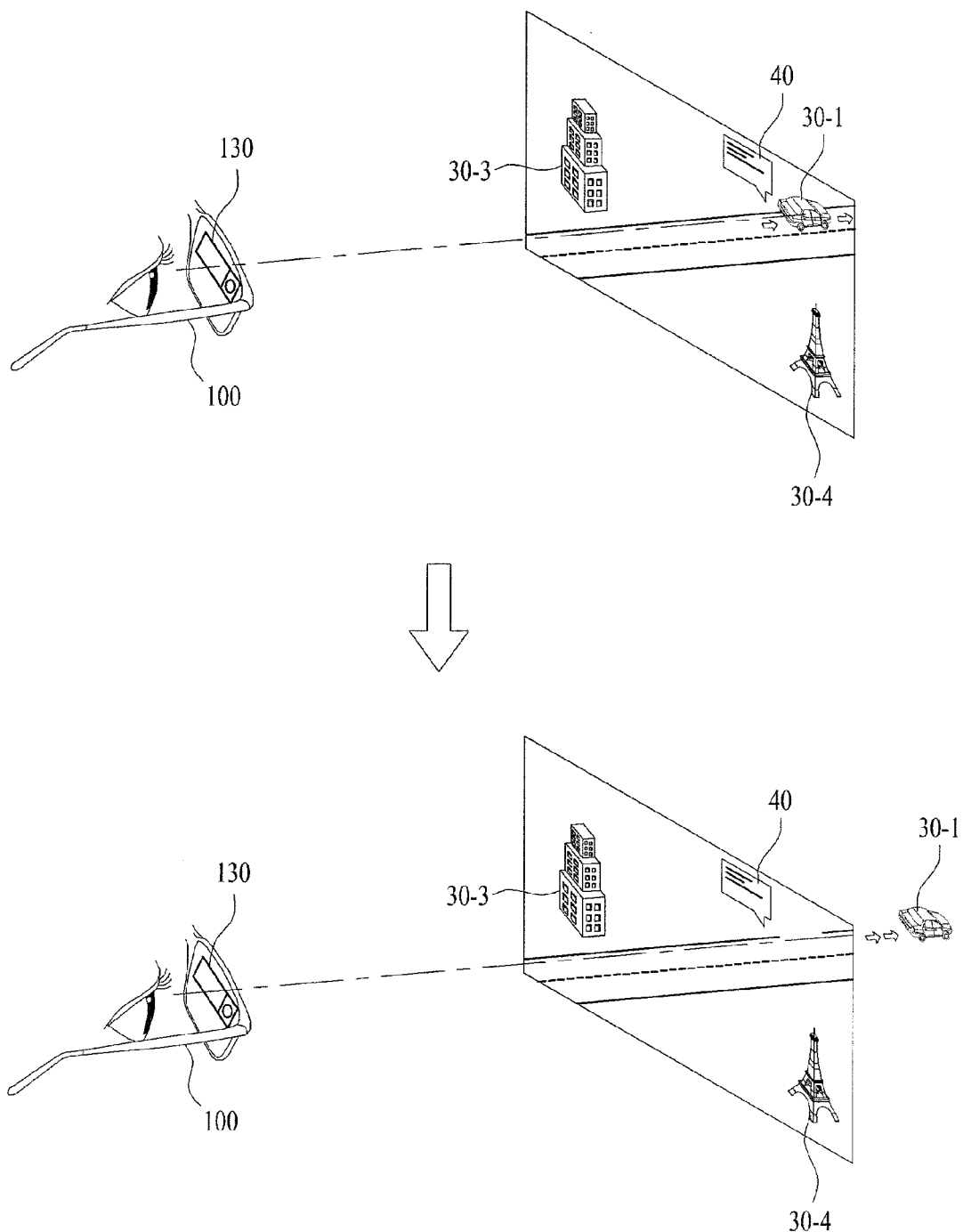
FIGS. 10A-10D are diagrams for a method of terminating a display of a virtual image based on a location of a user gaze when detecting a marker object is ended according to one embodiment.

FIGS. 10A-10D are diagrams for a method of terminating a display of a virtual image based on a location of a user gaze when detecting a marker object is ended according to one embodiment. FIG. 10 shows a virtual image displayed on each time (t1, t2, t3 and t4) via a display unit and time interval between each of the time (t1, t2, t3 and t4) is identical to each other. Referring to FIG. 10A, the portable device can detect a marker object 30-1 among a plurality of objects 30-1, 30-3, 30-4 in the image. The portable device can obtain virtual image information on the detected marker object 30-1. The portable device can display a virtual image 40 in a position corresponding to the marker object 30-1 based on the obtained virtual image information. When the detecting of the marker object 30-1 ends, the portable device can terminate a display of the virtual image 40. In this case, the portable device can detect a gaze location of a user. If the gaze location of the user is detected at a first location, the portable device can terminate the display of the virtual image 40 based on a first terminate mode. And, if the gaze location of the user is detected at a second location, the portable device can terminate the display of the virtual image 40 based on a second terminate mode.

More specifically, when the marker object 30-1 is disappeared from the image, the portable device can terminate the detecting of the marker object 30-1. In particular, when the marker object 30-1 is disappeared from a viewing angle of the camera unit, the portable device can terminate the detecting of the marker object 30-1. In this case, the portable device can detect a gaze location of a user using the aforementioned sensor unit. When the detecting of the marker object 30-1 is terminated, if the gaze location of the user is detected at a first location, the portable device can terminate the display of the virtual image 40 based on a first terminate mode. In this case, the first location may correspond to a position where the detecting of the marker object 30-1 is terminated within the image.

More specifically, the first location may correspond to a position where the marker object 30-1 is lastly detected when the marker object 30-1 is disappeared from the viewing angle of the camera unit. The portable device can detect movement of the gaze of the user according to the movement of the marker object 30-1. When the marker object 30-1 is disappeared, the portable device can detect the user gaze continuously gazing at a position where the marker object 30-1 is disappeared. In this case, the position where the marker object 30-1 is disappeared may correspond to the first location.

In case that the user gaze is detected at the first location, the portable device can terminate the display of the virtual image 40 based on the first terminate mode. In this case, a terminate mode may correspond to a mode determined based on a method of terminating the display of the virtual image 40. More specifically, in case of terminating the display of the virtual image 40, the portable device can terminate the display in a manner of changing at least one property selected from the group consisting of visibility, resolution, transparency, a shape, a size, color and brightness of the virtual image 40. In particular, the portable device can continuously change display properties while the display of the virtual image 40 is terminated. The terminate mode can be configured based on the aforementioned display property and can be differently configured by a user or a processor.

Figure 10B:
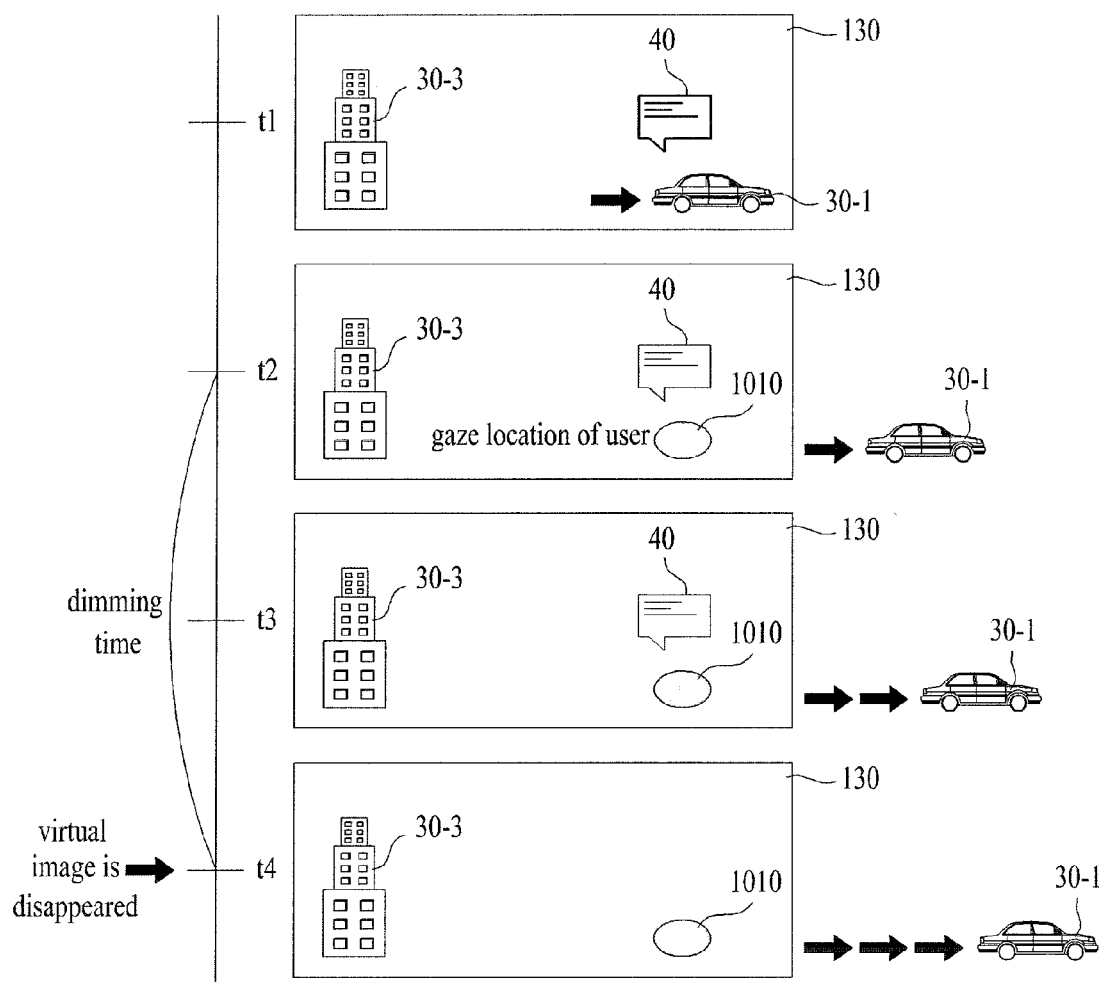

In this case, as an example, referring to FIG. 10B, the portable device can terminate the display of the virtual image 40 based on the first terminate mode. In this case, the first terminate mode may correspond to a mode terminating the display of the virtual image 40 after displaying the virtual image 40 for dimming time from timing on which the detecting of the marker object 30-1 is terminated. More specifically, the portable device can terminate the detecting of the marker object 30-1 on t2 time. In this case, a gaze location 1010 of a user can be detected at a first location where the marker object 30-1 is disappeared. Thereafter, the gaze location 1010 of the user can be maintained at the first location for t3 and t4 time. The portable device can maintain the display of the virtual image 40 from the t2 timing on which the marker object 30-1 is disappeared until the t4 time. Subsequently, if the t4 time comes, the portable device can terminate the display of the virtual image 40. In particular, the dimming time may correspond to time between the t2 and the t4. The first terminate mode maintains the display of the virtual image 40 for the dimming time. If the dimming time elapses, the portable device can terminate the display of the virtual image 40. In this case, as an example, the aforementioned dimming time can be changed by a user or a processor, by which the present specification may be non-limited. And, as an example, the portable device can change display property of the virtual image during the dimming time. The display property may correspond to at least one selected from the group consisting of a visibility, a resolution, a transparency, a shape, a size, a color and a brightness of the virtual image. As an example, the portable device can adjust the visibility of the virtual image 40 during the dimming time. The portable device can set the visibility of the virtual image 40 to the highest on the t2 time on which the marker object 30-1 is disappeared and may set the visibility of the virtual image 40 to be lowered as the time goes to the t3 and t4. In particular, the portable device can terminate the display of the virtual image 40 in a manner of gradually blurring the virtual image 40.

As a different example, the portable device can display the virtual image in a stationary state. In particular, the portable device can display the virtual image 40 on the top of the first location in the stationary state.

As a further different example, the portable device can configure a region within a threshold distance from the first location as a first region. In this case, the threshold distance may correspond to a value configured by a user or a processor. If a gaze location of a user is detected within the first region when the detecting of the marker object 30-1 is terminated, the portable device can terminate the display of the virtual image 40 based on the aforementioned first terminate mode. In particular, the portable device can detect a region within a prescribed error range for the gaze location of the user as the aforementioned first location.

And, if the gaze location of the user is detected at a second location, the portable device can terminate the display of the virtual image 40 based on a second terminate mode. In this case, the second location may correspond to a prescribed point other than the aforementioned first location in the image. In particular, the second location may correspond to one of remaining points other than the location from which the marker object is disappeared.

Figure 10C:
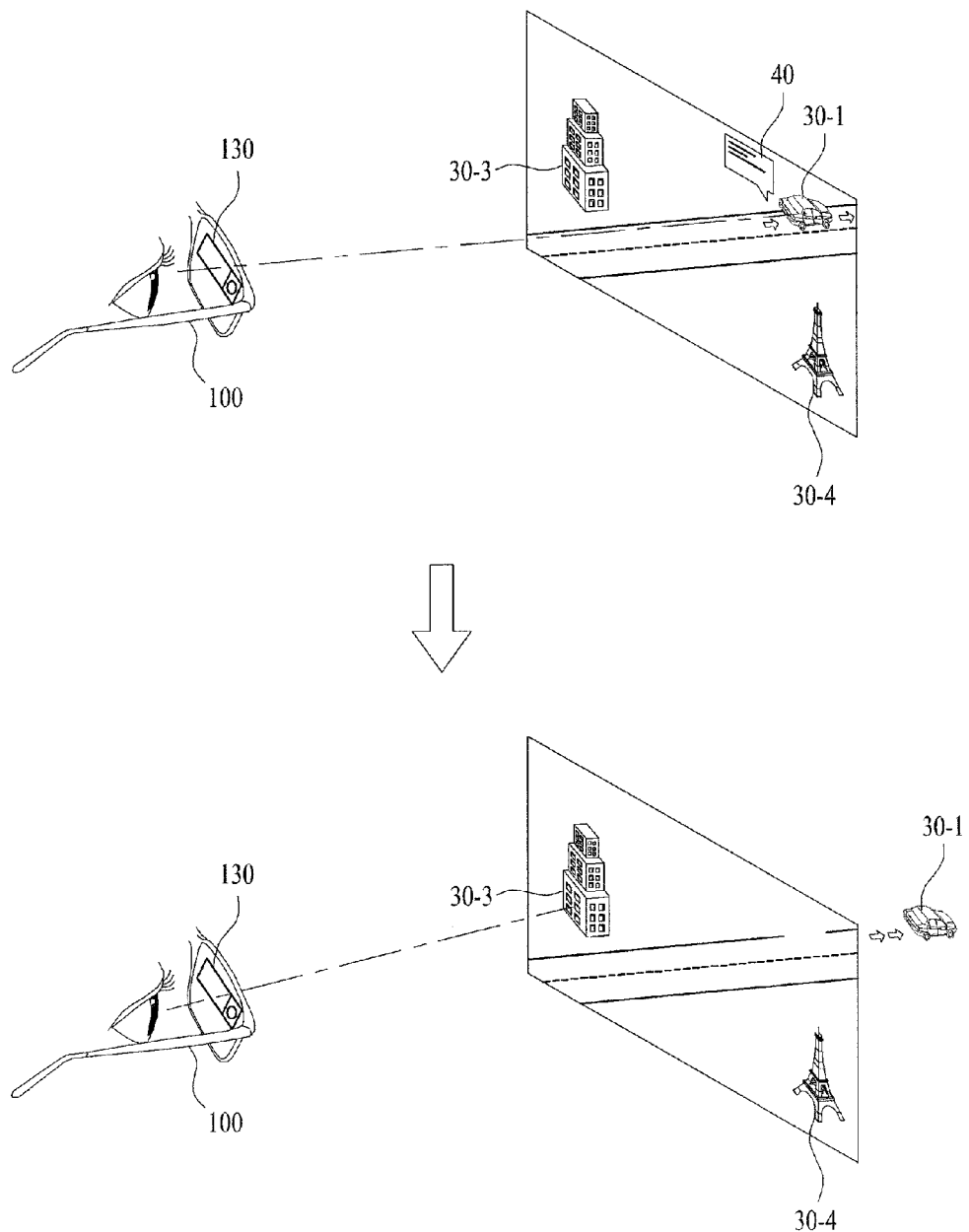

More specifically, referring to FIG. 10C, if the marker object 30-1 is disappeared, a user can move a gaze of the user to a neighboring object 30-3 within the image. In this case, the neighboring object 30-3 may correspond to one of remaining objects other than the marker object. In particular, if the marker object 30-1 is disappeared, the user takes an interest in the neighboring object 30-3 and can change the gaze location. In this case, the portable device can terminate the display of the virtual image 40 based on the second terminate mode. In this case, the second terminate mode may correspond to a mode immediately terminating the display of the virtual image 40 on the timing that the detecting of the marker object 30-1 is terminated. In particular, if the user is not interested in the marker object 30-1, the portable device can immediately terminate the display of the virtual image 40.

Figure 10D:
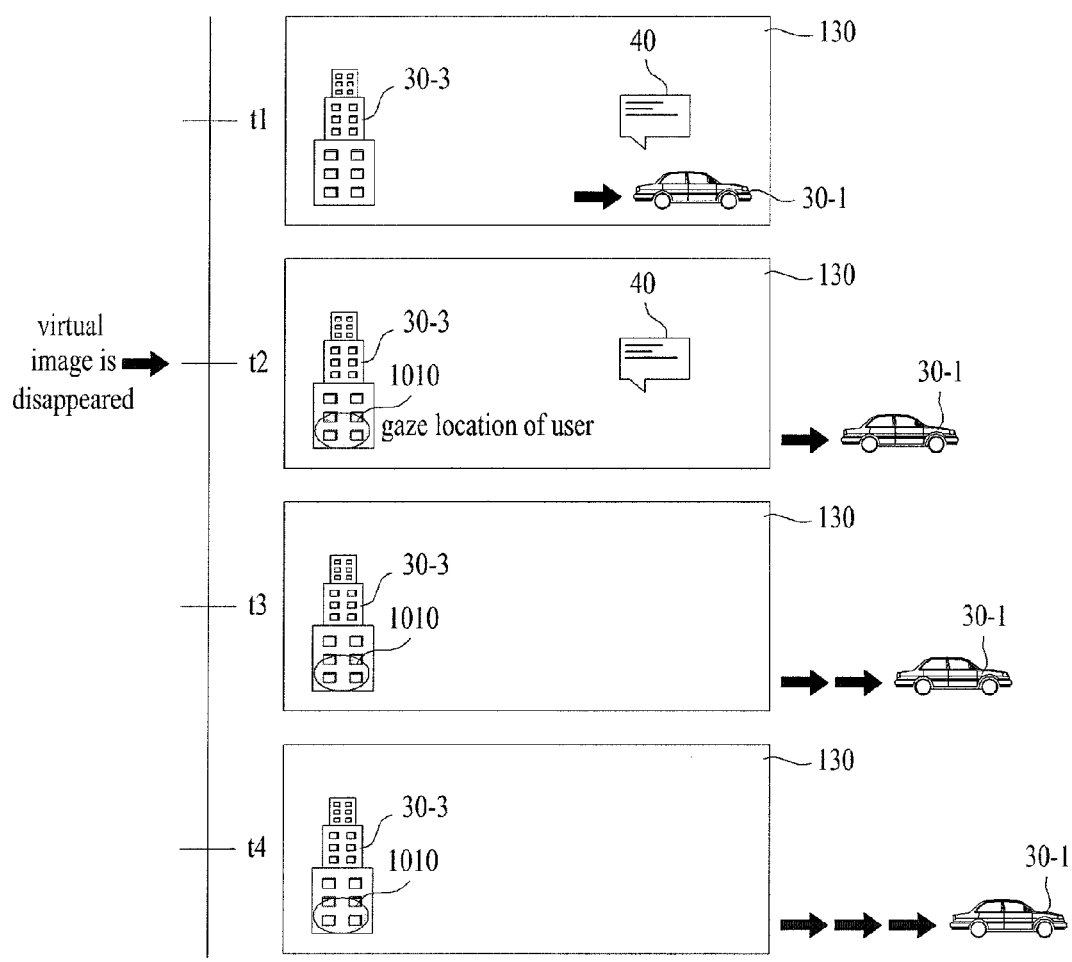

More specifically, referring to FIG. 10D, the portable device can terminate the detecting of the marker object 30-1 on the t2 time. In this case, the portable device can detect a gaze location 1010 of a user at a location in which the neighboring object 30-3 is displayed. In particular, the portable device can detect the gaze location 1010 of the user at a second location. In this case, the portable device can terminate the display of the virtual image 40 on the t2 time on which the detecting of the marker object 30-1 is terminated. In particular, the portable device can immediately terminate the display of the virtual image 40 on the t2 time on which the detecting of the marker object 30-1 is terminated.

And, as an example, the portable device can configure a region other than the aforementioned first region as a second region. In this case, if the portable device detects that the gaze location of the user is positioned at the second region, the portable device can immediately terminate the display of the virtual image based on the second terminate mode.

Figure 11A:
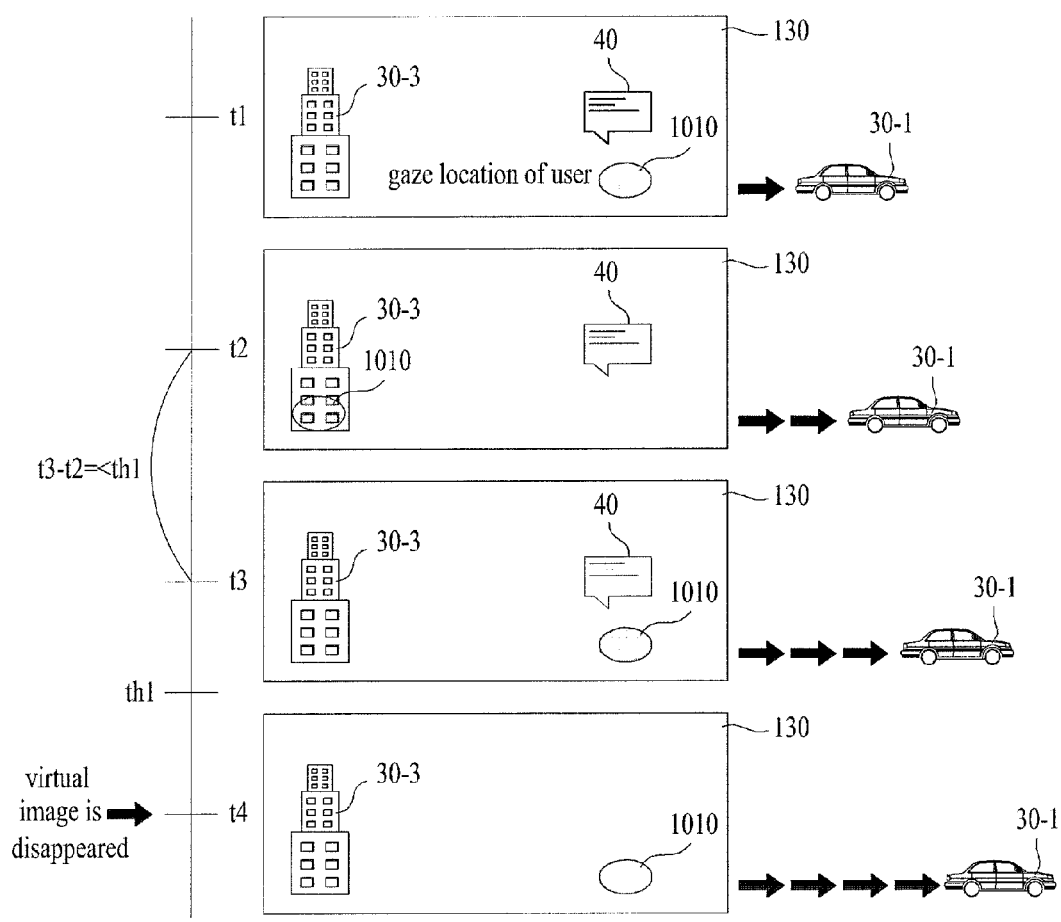

FIGS. 11A-11B are diagrams for a method of terminating a display of a virtual image based on time of changing a user gaze according to one embodiment. As mentioned in the foregoing description, if the gaze location 1010 of the user is detected at the first location when the detecting of the marker object 30-1 is terminated, the portable device can terminate the display of the virtual image 40 based on the first terminate mode. In this case, the first terminate mode may correspond to a mode terminating the display after the display of the virtual image 40 is maintained for a dimming time. In this case, referring to FIG. 11A, the dimming time may correspond to time from t2 to t4. In particular, the portable device can maintain the display of the virtual image 40 from t2 to t4.

In this case, the portable device can detect a change of the gaze location 1010 of the user for the dimming time. As an example, a timing on which the gaze location 1010 of the user is changing may correspond to either a timing on which the dimming time starts or the dimming time. The portable device can detect that the gaze location 1010 of the user is changing from the first location to a second location. In this case, if the portable device detects that the gaze location 1010 moves back from the second location to the first location again within a threshold time (th 1) from the timing on which the gaze location 1010 of the user has changed, the portable device can maintain the display of the virtual image 40. More specifically, referring to FIG. 11A, the portable device can detect that the gaze location 1010 of the user is changing to the second location on the t2 time. Thereafter, the portable device can detect that the gaze location 1010 of the user is changing from the second location to the first location on the t3 time. In this case, if the duration from the t2 to the t3 is less than the threshold time (th 1), the portable device can maintain the display of the virtual image 40. Subsequently, the portable device can terminate the display of the virtual image 40 after t4, which is a terminating point of the dimming time, elapses.

And, referring to FIG. 11B, the portable device can detect that the gaze location 1010 of the user is changing to the second location on the t2 time. Thereafter, the portable device can detect that the gaze location 1010 of the user is changing from the second location to the first location on the t3 time. In this case, if the duration from the t2 to the t3 is greater than the threshold time (th 1), the portable device can terminate the display of the virtual image 40. In this case, as an example, the portable device can immediately terminate the display of the virtual image 40 on a timing that the threshold time (th 1) elapses. In particular, if the gaze of the user is not going back to an original state within the threshold time (th 1), the portable device can immediately terminate the display of the virtual image 40.

Figure 12A:
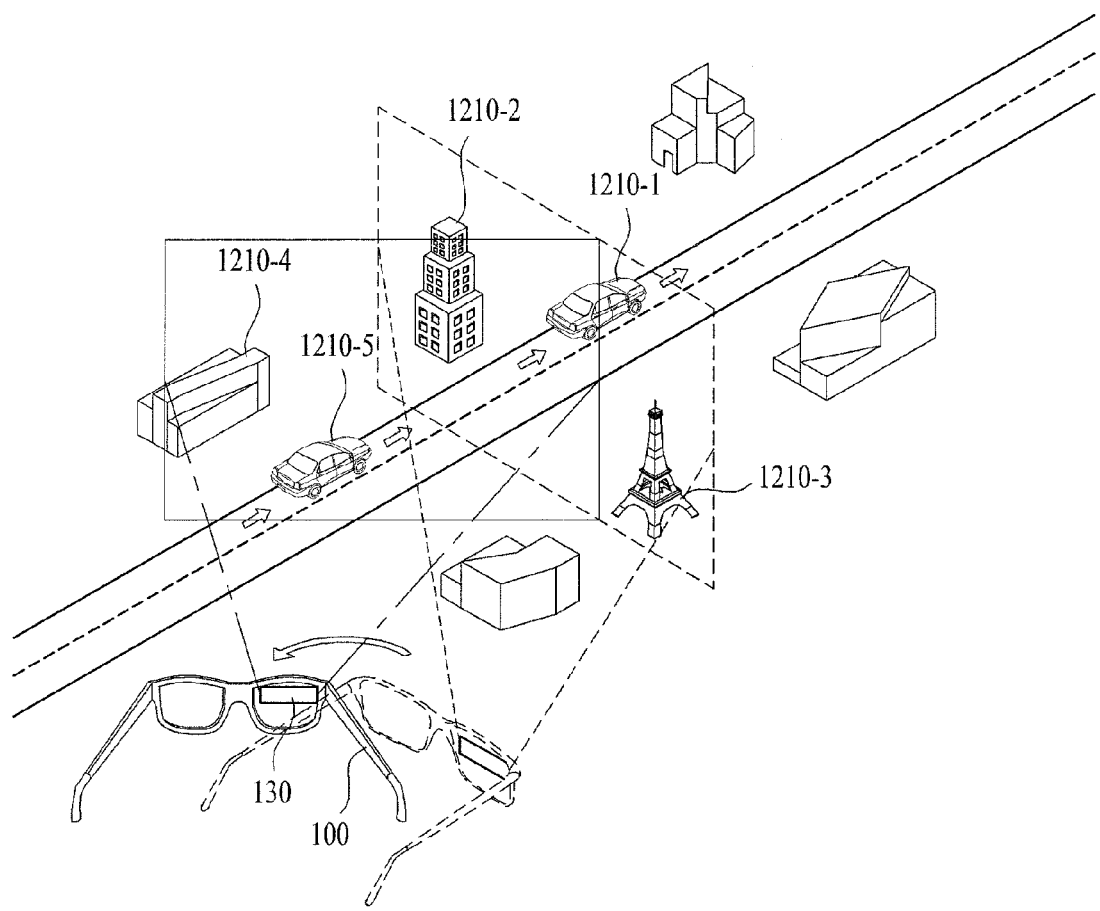
FIGS. 12A-12C are diagrams for a method of terminating a display of a virtual image 1220 when a viewing angle of a portable device changes.
Figure 12B:
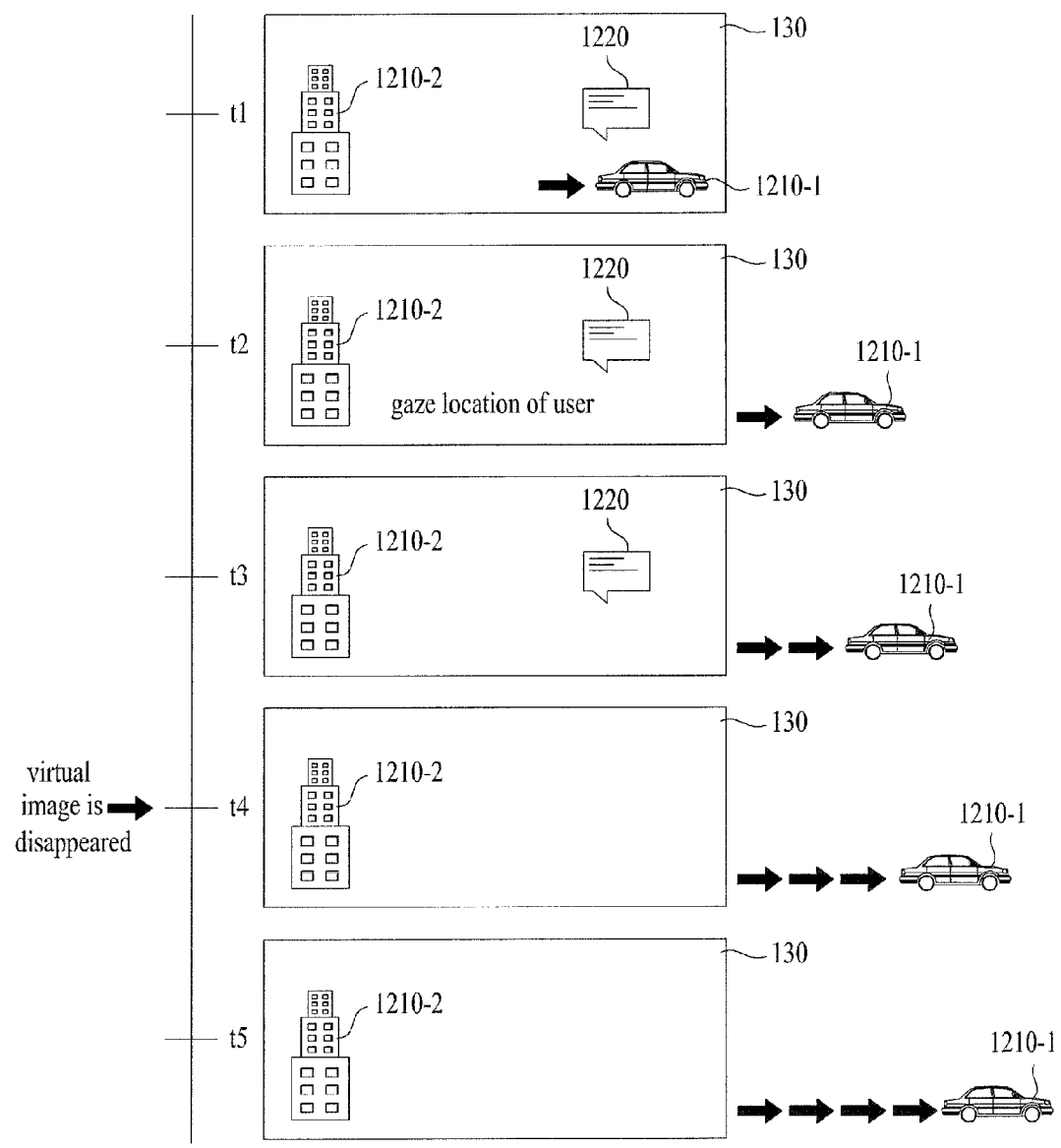
Figure 12C:
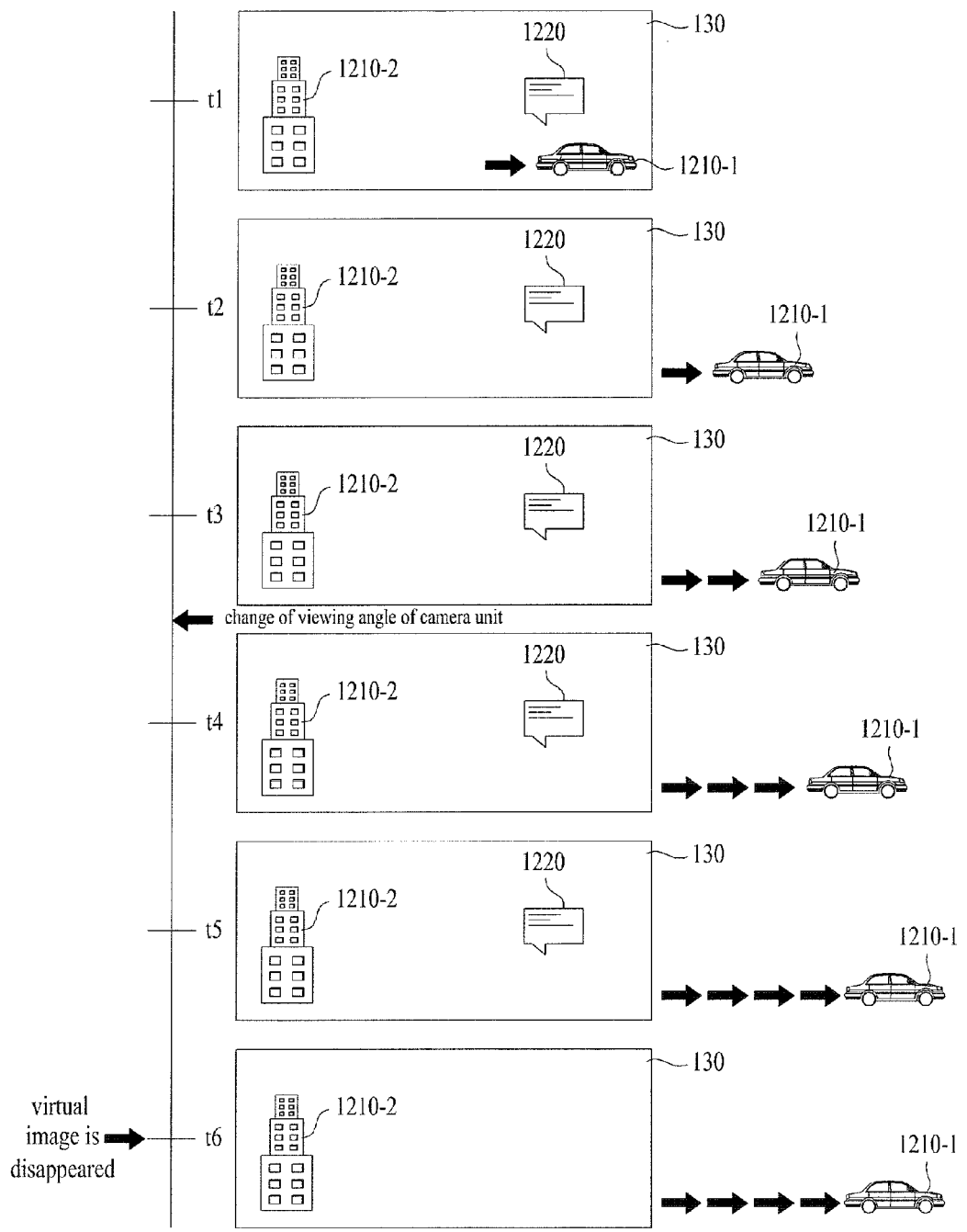

FIGS. 12A-12C are diagrams for a method of terminating a display of a virtual image 1220 when a viewing angle of a portable device changes. The portable device can detect a marker object 1210-1 based on a viewing angle of the camera unit. In this case, if the viewing angle of the camera unit changes, the portable device can change dimming time on which the display of the virtual image 1220 is terminated. More specifically, referring to FIG. 12A, the portable device detects the marker object 1210-1 and can detect that the viewing angle of the camera unit is changing.

Referring to FIG. 12B, if the viewing angle of the camera unit is not changed, the portable device can maintain the display of the virtual image 1220 for the dimming time. In particular, the portable device maintains the display of the virtual image 1220 for the dimming time from the t2 on which the marker object has disappeared to the t4. If the t4 time elapses, the portable device can terminate the display of the virtual image 1220.

Referring to FIG. 12C, if the viewing angle of the camera unit changes, the portable device can change the dimming time for which the display of the virtual image 1220 is maintained. As an example, if the viewing angle of the camera unit is different from a moving direction of the marker object 1210-1, the portable device can increase the dimming time. In particular, the portable device changes the dimming time from t2 to t6 and can maintain the display of the virtual image 1220 until the t6 time. By doing so, the portable device can provide virtual image information to a user for a longer time. In this case, as an example, the viewing angle of the camera unit can change on either a timing on which the dimming time starts or a prescribed timing of the dimming time. If the portable device detects that the viewing angle of the camera unit is changing within the dimming time, the portable device can change the dimming time.

And, as an example, the portable device can also decrease the dimming time, by which the present specification may be non-limited.

Figure 13A:
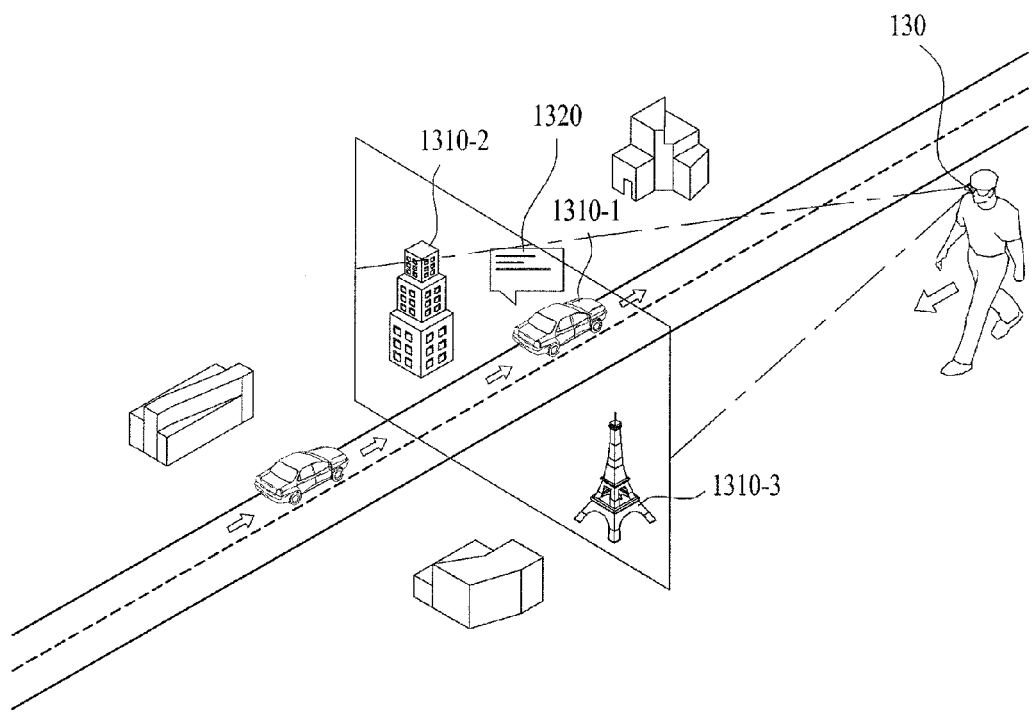

FIGS. 13A-13C are diagrams for a method of terminating a display of a virtual image 1320 in consideration of a moving speed and a moving direction of a user. As mentioned in the foregoing description, the portable device can detect a moving speed and a moving direction of a user using the sensor unit. And, the portable device can detect a moving speed and a moving direction of the portable device using the sensor unit according to the movement of the user. In this case, when the user or the portable device moves, the portable device can change dimming time based on the moving speed and the moving direction of the user or the portable device. As an example, referring to FIG. 13A, the user may moves to a direction opposite to a marker object 1310-1. In this case, the marker object 1310-1 may be more quickly disappeared from the portable device due to the movement of the user. Hence, it is necessary for the user to change the dimming time for which the display of the virtual image 1320 for the marker object 1310-1 is maintained. In this case, the portable device can change the dimming time in consideration of the moving speed of the user or the portable device, the moving direction and a moving speed of the marker object 1310-1, by which the present specification may be non-limited.

As an example, referring to FIG. 13B, if the user does not move, detecting of the marker object 1310-1 can be terminated on t3 time. In this case, the portable device displays the virtual image 1320 from the t3 time on which the detecting of the marker object 1310-1 is terminated to t5 time and can terminate the display of the virtual image 1320. In particular, the dimming time may correspond to time from the t3 to the t5. In this case, as an example, referring to FIG. 13C, if the user moves, the detecting of the marker object 1310-1 can be terminated on t2 time. In this case, the dimming time may correspond to time from the t2 on which the marker object 1310-1 is disappeared to t4. Yet, the portable device can increase the dimming time in consideration of a point that the moving direction of the user is an opposite direction of the moving direction of the marker object 1310-1. In this case, the dimming time may be increased to time from the t2 to the t5. And, as an example, if the moving speed of the user increases, the portable device can make the dimming time to be increased more. And, as an example, if the moving speed of the marker object 1310-1 increases, the portable device can make the dimming time to be increased more. In particular, portable device can adjust the dimming time based on the moving speed of the user, the moving direction of the user, the moving direction of the marker object 1310-1 and the moving speed of the marker object.

Figure 14A:
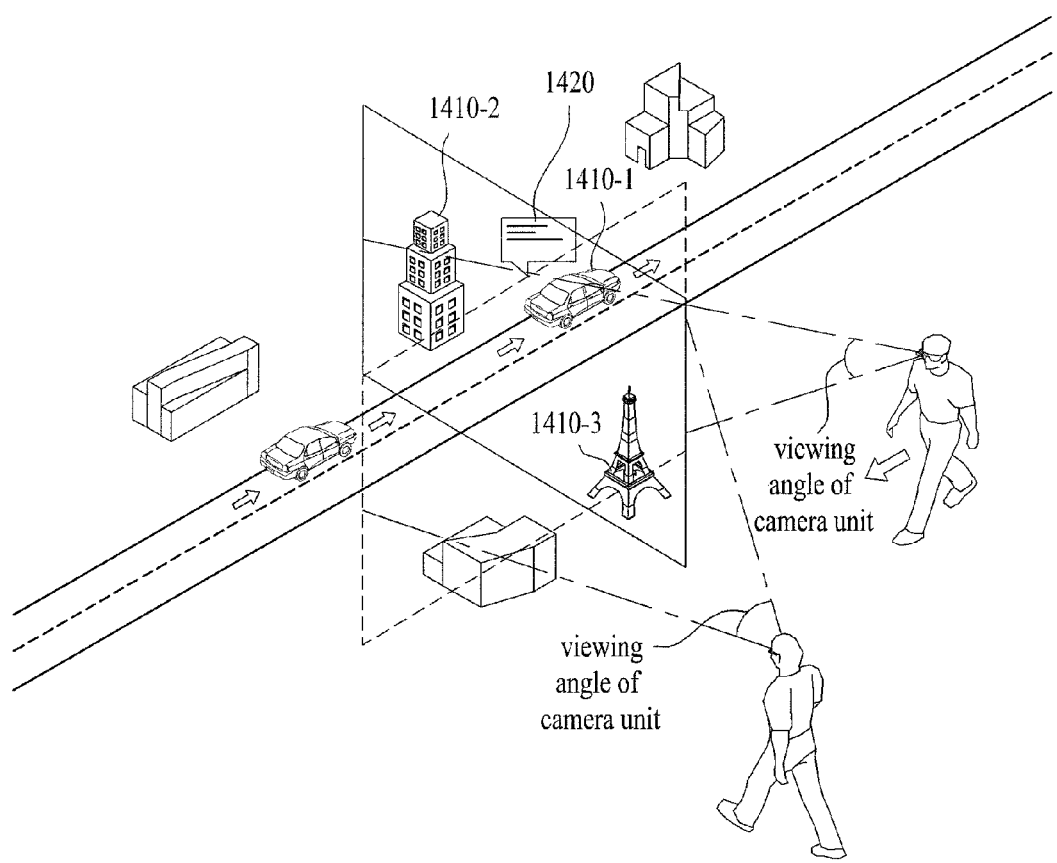
FIGS. 14A-14B are diagrams for a method of controlling a display of a virtual image in consideration of whether a user is moving or a change of a viewing angle.
Figure 14B:
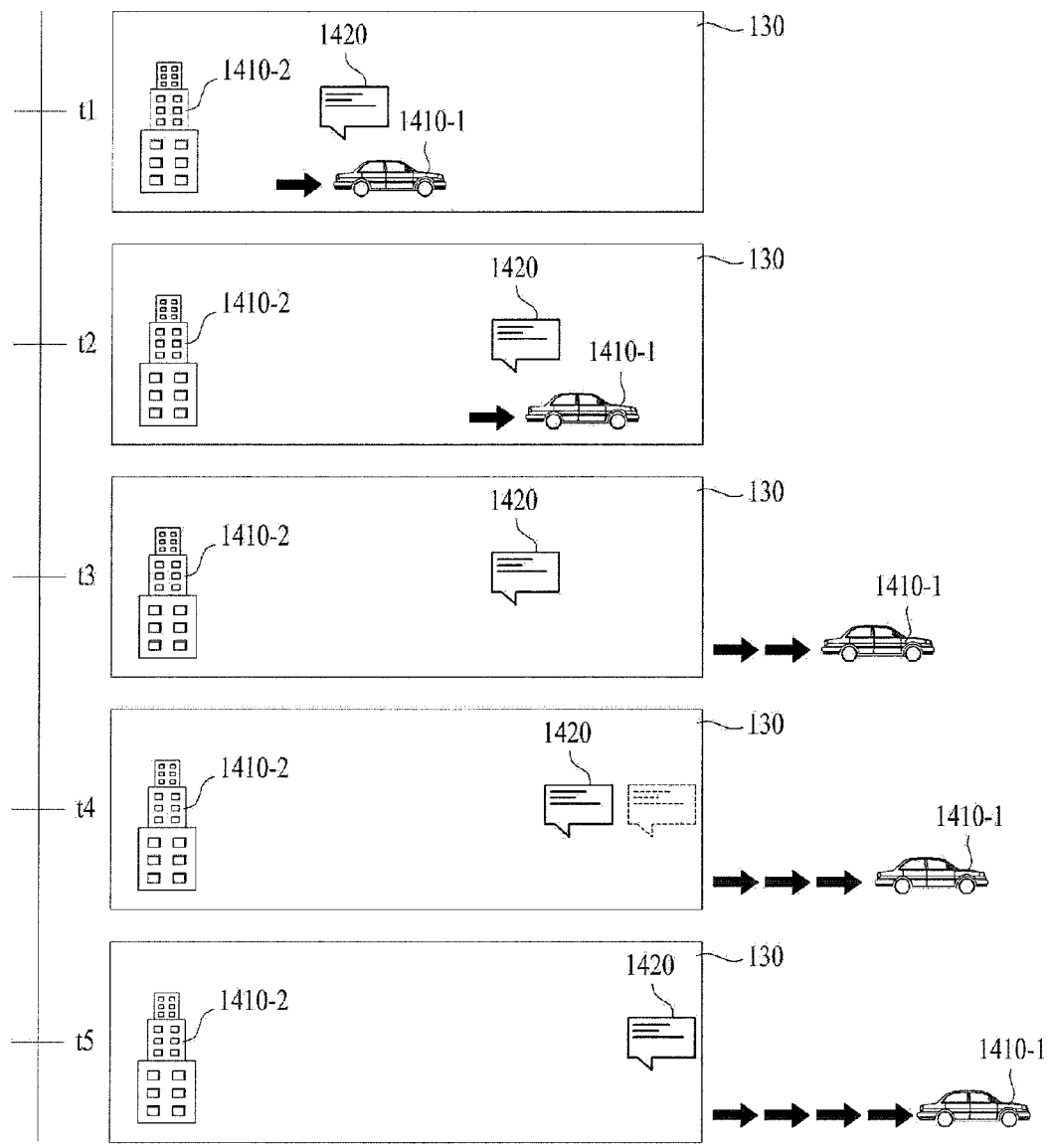

FIGS. 14A-14B are diagrams for a method of controlling a display of a virtual image in consideration of whether a user is moving or a change of a viewing angle. FIG. 14 shows a virtual image displayed via the display unit on each time (t1, t2, t3 and t4) and an interval between each of the times (t1, t2, t3, and t4) is identical to each other.

As mentioned in the foregoing description, if a moving speed of a virtual image 1420 is slower than a first reference speed, the portable device moves the virtual image 40 according to a location change of a marker object 1410-1 and can continuously display the virtual image 1420 in the vicinity of the marker object 1410-1. In this case, the first reference speed is a predetermined speed and indicates a minimum speed required to read the moving virtual image 1420. In particular, if the moving speed of the virtual image 1420 is slower than the first reference speed, a user can sufficiently read the virtual image 1420. Yet, if the moving speed of the virtual image 1420 is faster than the first reference speed, the user is not able to sufficiently read the virtual image 1420. Hence, it is necessary for the portable device to configure the moving speed of the virtual image 1420 to be slower than the first reference speed.

More specifically, the portable device can obtain a first moving speed corresponding to the moving speed of the virtual image 1420 or a second moving speed corresponding to a moving speed of the marker object 1410-1. In this case, if it is determined that the first moving speed or the second moving speed is slower than the first reference speed, the portable device can lower the first moving speed to be slower than the first reference speed. In particular, the portable device can make a user sufficiently read the virtual image 1420 in a manner of reducing the moving speed of the virtual image 1420.

In this case, referring to FIG. 14A, a user can wear the portable device. In this case, if the user moves, the portable device can also move together with the user. And, the user can move while carrying the portable device. In particular, the portable device can be moved together due to the movement of the user. In this case, the portable device can detect the movement of the user using the aforementioned sensor unit. And, as an example, the portable device can detect a moving speed of the user and a moving direction of the user. More specifically, the portable device can detect whether the portable device worn on the user or carried by the user is moving, a moving speed of the portable device and a moving direction of the portable device.

If the user wearing the portable device is moving, the first moving speed of the virtual image 1420 and the second moving speed of the marker object 1410-1 can be changed. More specifically, the first moving speed of the virtual image 1420 and the second moving speed of the marker object 1410-1 can be changed based on the moving speed of the user and the moving direction of the user. In this case, as an example, if the user moves to a direction opposite to the moving direction of the marker object 1410-1 and the virtual image 1420, the user may not sufficiently read the virtual image due to the moving speed of the user. If the portable device detects that the user is moving, the portable device can configure the first moving speed of the virtual image 1420 to be slower than a second reference speed, which is slower than the first reference speed. In particular, if the user moves, the portable device can lower the first moving speed of the virtual image 1420 more. By doing so, the portable device can make the user sufficiently read the virtual image 1420.

As a different example, the portable device can detect that a viewing angle of the camera unit is changing. In this case, as mentioned in the foregoing description, if the marker object 1410-1 is disappeared from the viewing angle of the camera unit, the portable device can terminate the detecting of the marker object 1410-1. And, if the viewing angle of the camera unit is changed, a location in which the marker object 1410-1 is displayed in the image may be changed as well. Hence, if the viewing angle of the camera unit is changed, a location in which the virtual image 1420 corresponding to the marker object 1410-1 is displayed can be changed as well. In this case, a user may not sufficiently read the virtual image 1420. In this case, as an example, if the viewing angle of the camera unit is changed to a direction opposite to the moving direction of the marker object 1410-1 and the virtual image 1420, the location in which the virtual image 1420 is displayed can move to an edge of the image. In this case, the user may not sufficiently read the virtual image 1420. The portable device can configure the first moving speed of the virtual image 1420 to be slower than the second reference speed. In particular, if the viewing angle of the camera unit is changing, the portable device can lower the first moving speed of the virtual image 1420 more. By doing so, the portable device can make the user sufficiently read the virtual image 1420.

And, as an example, the aforementioned second reference speed can be configured based on a second moving speed of the marker object 1410-1, a first moving speed of the virtual image 14120, a moving speed of the user and a moving direction of the user. As an example, if the second moving speed of the marker object 1410-1 or the moving speed of the user increases, the second reference speed may be lowered more. And, as an example, if the moving direction of the user is opposite to the moving direction of the marker object 1410-1, the second reference speed may be lowered more. In particular, the portable device can configure the second reference speed in consideration of the moving speed and the moving direction of the marker object 1410-1, the virtual image 1420 and the user.

As an example, referring to FIG. 14B, if the marker object 1410-1 is moving, the virtual image 1420 can move together with the marker object in a location adjacent to the marker object. In this case, the portable device can terminate the detecting of the marker object 1410-1 on t3 time. In particular, the marker object 1410-1 can get out of the viewing angle of the camera unit on the t3 time. In this case, if a user wearing the portable device does not move, the portable device can move the virtual image 1420 with a speed slower than the first reference speed. And, if the user wearing the portable device moves, the portable device can move the virtual image 1420 with a speed slower than the second reference speed. Hence, if the user wearing the portable device does not move, the virtual image 1420 arrives at an edge of the image on t4 time and the display can be terminated. Yet, if the user wearing the portable device moves, the virtual image 1420 of which its speed is more lowered arrives at the edge of the image on t5 time and the display can be terminated. In particular, if the user wearing the portable device moves, the portable device lowers the moving speed of the virtual image and can delay time on which the display is terminated.

Figure 15:
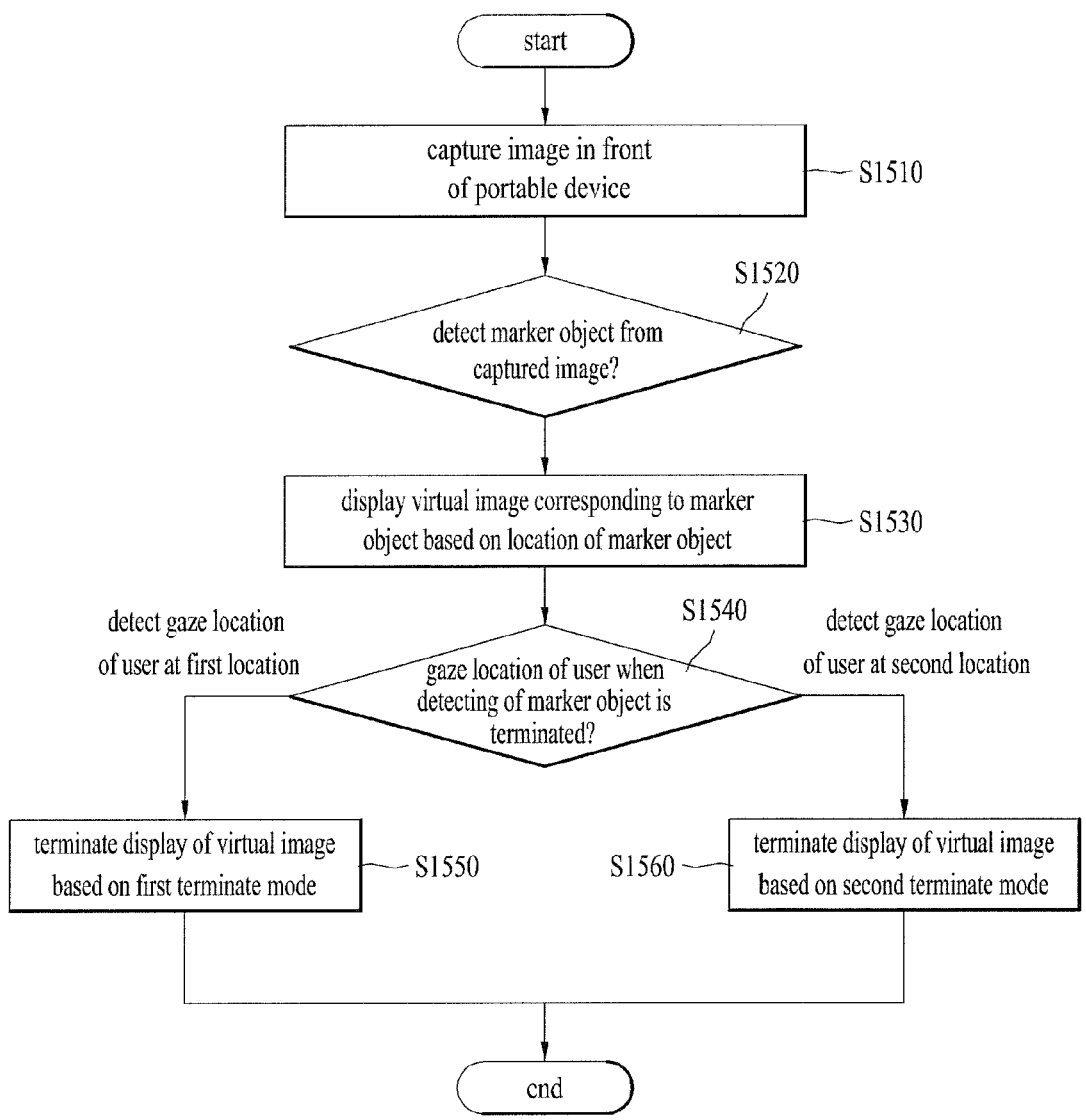
FIG. 15 is a flowchart for a method of controlling a portable device according to one embodiment.

FIG. 15 is a flowchart for a method of controlling a portable device according to one embodiment.

The portable device can capture an image in front of the portable device [S1510]. As mentioned earlier in FIG. 2, the portable device captures the image in front of the device within a viewing angle of the camera unit and can deliver the captured image to the processor. In this case, the camera unit can capture the image in front of the device contiguously or with a specific time interval.

Subsequently, the portable device can detect a marker object from the captured image [S1520]. As mentioned earlier in FIG. 2, the portable device can detect the marker object from the image captured by the camera unit. And, the portable device can detect the marker object from data corresponding to an image displayed in the display unit. And, if the marker object is detected, the portable device can obtain virtual image information on a virtual image related to the marker object.

Subsequently, the portable device can display the virtual image corresponding to the marker object based on a location of the marker object [S1530]. As mentioned earlier in FIG. 4, the portable device can detect an absolute location change of the marker object or a relative location change between the device and the marker object from the image captured by the camera unit or the data corresponding to the image displayed in the display unit. And, the portable device can distinctively identify the absolute location change of the marker object and the relative location change using a sensed result for a location of the marker object and a direction of the marker object sensed by the sensor unit and the portable device can perform data processing according to each of the changes.

Subsequently, the portable device can detect a user gaze when detecting of the marker object is terminated [S1540]. As mentioned earlier in FIG. 10, the portable device can terminate the detecting of the marker object when the marker object is disappeared from the image. In particular, the portable device can terminate the detecting of the marker object when the marker object is disappeared from the viewing angle of the camera unit. In this case, the portable device can detect the gaze location of the user using the aforementioned sensor unit.

Subsequently, if the gaze location of the user is detected at a first location, the portable device can terminate the display of the virtual image based on a first terminate mode [S1550]. As mentioned earlier in FIG. 10, the first location may correspond to a location at which the marker object is lastly detected when the marker object is disappeared from the viewing angle of the camera unit. The portable device can detect that the gaze of the user is moving according to the movement of the marker object. The portable device can detect the user gaze continuously gazing at a position where the marker object is disappeared. In this case, the position where the marker object is disappeared may correspond to the first location. In this case, the first terminate mode may correspond to a mode terminating the display of the virtual image after displaying the virtual image for dimming time from the timing on which the detecting of the marker object is terminated.

Subsequently, if the gaze location of the user is detected at a second location, the portable device can terminate the display of the virtual image based on a second terminate mode [S1560]. As mentioned earlier in FIG. 10, the second location may correspond to a prescribed point in the image other than the aforementioned first location. In particular, the second location may correspond to one of remaining locations other than the location from which the marker object is disappeared. And, the second terminate mode may correspond to a mode immediately terminating the display of the virtual image when the detecting of the marker object is terminated. In particular, if the user is not interested in the marker object, the portable device can immediately terminate the display of the virtual image.

Figure 16:
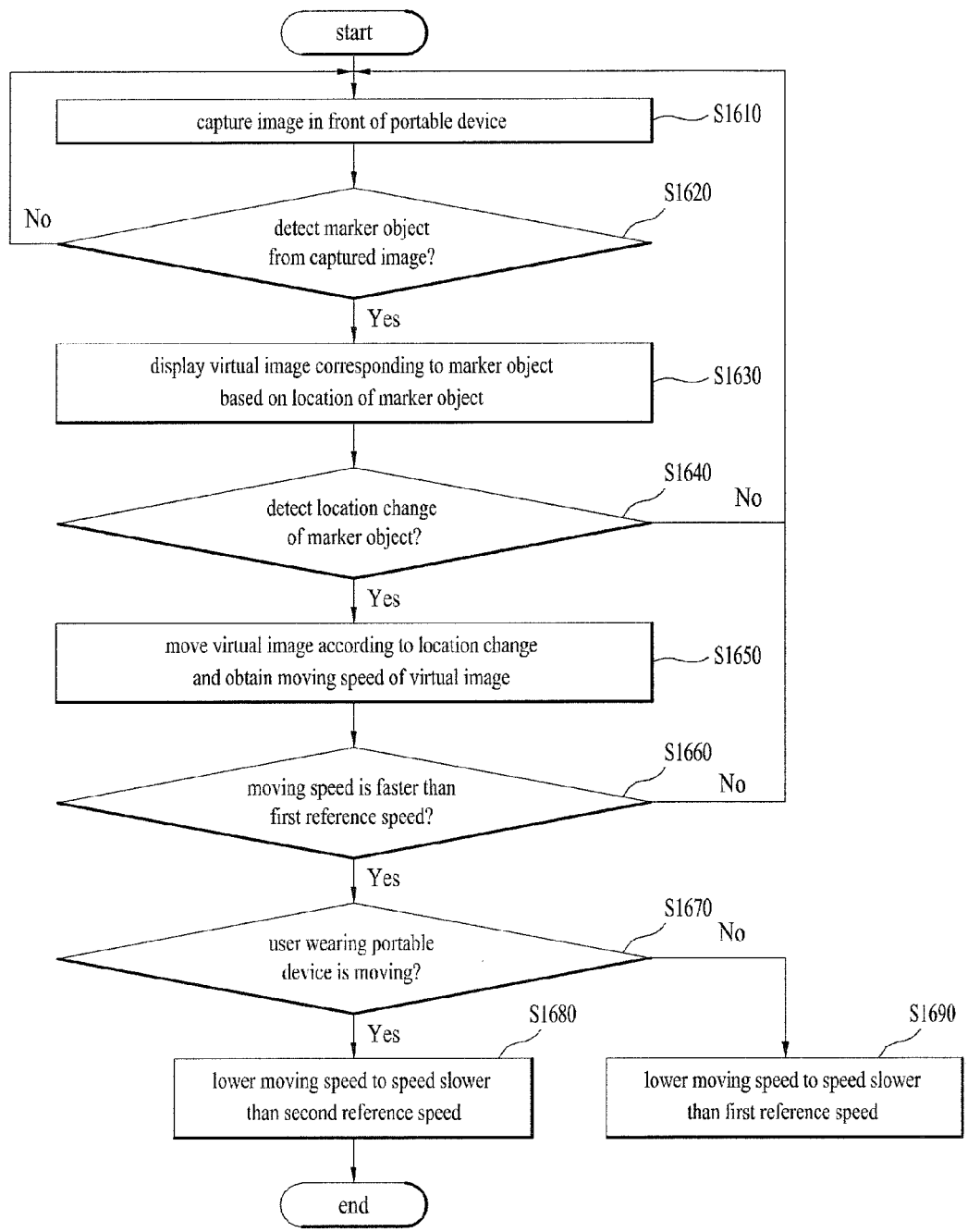
FIG. 16 is a flowchart for a method of controlling a portable device according to one embodiment.

FIG. 16 is a flowchart for a method of controlling a portable device according to one embodiment.

The portable device can capture an image in front of the portable device [S1610]. As mentioned earlier in FIG. 2, the portable device captures the image in front of the device within a viewing angle of the camera unit and can deliver the captured image to the processor. In this case, the camera unit can capture the image in front of the device contiguously or with a specific time interval.

Subsequently, the portable device can detect a marker object from the captured image [S1620]. As mentioned earlier in FIG. 2, the portable device can detect the marker object from the image captured by the camera unit. And, the portable device can detect the marker object from data corresponding to an image displayed in the display unit.

Subsequently, the portable device can display a virtual image corresponding to the marker object based on a location of the marker object [S1630]. As mentioned earlier in FIG. 2, if the marker object is detected, the portable device can display the virtual image in a position corresponding to the marker object based on obtained virtual image information.

Subsequently, the portable device can detect a location change of the marker object [S1640]. As mentioned earlier in FIG. 4, the portable device can detect an absolute location change of the marker object or a relative location change between the device and the marker object from the image captured by the camera unit or data corresponding to an image displayed in the display unit. And, the portable device can distinctively identify the absolute location change and the relative location change of the marker object using a sensed result of a location of the marker object and a direction of the marker object sensed by the sensor unit. The portable device can perform data processing corresponding to each of the location changes.

Subsequently, the portable device moves the virtual image according to a location change of the marker object and can obtain a moving speed of the virtual image [S1650]. As mentioned earlier in FIG. 5, the portable device moves the virtual image according to the location change of the marker object and can continuously display the virtual image in the vicinity of the marker object. And, the portable device can obtain the moving speed of the virtual image or a moving speed of the marker object. Moreover, the portable device can further obtain acceleration of the virtual image or acceleration of the marker object.

Subsequently, the portable device can determine whether the moving speed of the virtual image or the moving speed of the marker object is faster than a first reference speed [S1660]. As mentioned earlier in FIG. 5, the first reference speed is a predetermined speed and may correspond to a minimum speed required to read the moving virtual image.

Subsequently, the portable device can detect whether a user wearing the portable device is moving [S1670]. In this case, as mentioned earlier in FIG. 1, the sensor unit can detect whether the user is moving, a moving speed of the user and a moving direction of the user.

Subsequently, if a movement of the user is detected, the portable device can lower the moving speed of the virtual image to a speed slower than a second reference speed [S1680]. And, if the movement of the user is not detected, the portable device can lower the moving speed of the virtual image to a speed slower than a first reference speed [S1690]. As mentioned earlier in FIG. 14, the second reference speed may be slower than the first reference speed. If the user is moving, the user may not sufficiently read the virtual image. Hence, the portable device lowers the moving speed of the virtual image to a speed slower than the second reference speed, which is slower than the first reference speed, to increase readability of the virtual image. And, as mentioned in the foregoing description, if the viewing angle of the camera unit is changed, the portable device can lower the moving speed of the virtual image to a speed slower than the second reference speed.

Moreover, for clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A portable device according to the present specification and a controlling method therefor may not limitedly apply to the composition and method of the aforementioned embodiments. The aforementioned embodiments may be configured in a manner of being selectively combined the whole of the embodiments or a part of the embodiments to achieve various modifications.

Meanwhile, a portable device according to the present specification and a method of controlling therefor can be implemented with a code readable by a processor in a recording media readable by the processor installed in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, implementing in a form of a carrier wave such as a transmission via the internet and the like is also included. The recording media readable by the processor are distributed to the computer systems connected by a network and codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on the both of the inventions can be complementally applied, if necessary.

What is claimed is:

1. A portable device, comprising:
a camera unit configured to capture an image in front of the portable device;
a display unit configured to display a virtual image;
a sensor unit configured to detect a gaze location of a user and deliver the detected gaze location to a processor; and
the processor configured to control the camera unit, the display unit and the sensor unit,
wherein the processor is further configured to:
detect a marker object from the image,
display the virtual image corresponding to the marker object based on a location of the marker object,
when detecting of the marker object is terminated,
terminate a display of the virtual image based on a first terminate mode if the gaze location of the user is detected at a first location, and
terminate the display of the virtual image based on a second terminate mode if the gaze location of the user is detected at a second location.

2. The portable device of claim 1, wherein the image is captured based on a viewing angle of the camera unit, and
wherein the processor is further configured to terminate the detecting of the marker object when the marker object is outside the viewing angle of the camera unit.

3. The portable device of claim 2, wherein the processor is further configured to set a location at which the detecting of the marker object is terminated within the image of the first location.

4. The portable device of claim 3, wherein the processor is further configured to set a point within the image other than the first location to the second location.

5. The portable device of claim 3, wherein the processor is further configured to:
set a region within a threshold distance from the first location to a first region, and
terminate the display of the virtual image based on the first terminate mode when the gaze location of the user is detected in the first region.

6. The portable device of claim 5, wherein the processor is further configured to:
set a region other than the first region in the image to a second region, and
terminate the display of the virtual image based on the second terminate mode when the gaze location of the user is detected in the second region.

7. The portable device of claim 1, wherein the processor is further configured to:
if the display of the virtual image is terminated based on the first terminate mode, display the virtual image during dimming time from a time point of detecting of the marker object is terminated and terminate the display of the virtual image.

8. The portable device of claim 7, wherein the processor is further configured to continuously change a display property of the virtual image displayed during the dimming time.

9. The portable device of claim 8, wherein the display property comprises at least one selected from the group consisting of a visibility, a resolution, a transparency, a shape, a size, a color and a brightness.

10. The portable device of claim 7, wherein the processor is further configured to:

if it is detected that the gaze location of the user changes from the first location to the second location during the dimming time, terminate the display of the virtual image when a predetermined time elapses from a time point of the gaze location of the user is changed.

11. The portable device of claim 10, wherein the processor is further configured to:
if it is detected that the gaze location of the user changes from the second location to the first location within the predetermined time from the time point of the gaze location of the user is changed, maintain the display of the virtual image although the predetermined time elapses.

12. The portable device of claim 7, wherein the image is captured based on a viewing angle of the camera unit, and
wherein the processor is further configured to:
if a change of the viewing angle of the camera unit is detected, change the dimming time.

13. The portable device of claim 7, wherein the sensor unit is further configured to detect a moving direction of the user and a moving speed of the user, and
wherein the processor is further configured to set the dimming time based on the moving direction of the user and the moving speed of the user.

14. The portable device of claim 1, wherein the processor is further configured to:
if the display of the virtual image is terminated based on the second terminate mode, terminate the display of the virtual image when the detecting of the marker object is terminated.

15. The portable device of claim 1, wherein the virtual image comprises at least one selected from the group consisting of augmented reality information related to the marker object, information on a display mode, information on a graphic user interface format.

16. A portable device, comprising:
a camera unit configured to capture an image in front of the portable device;
a display unit configured to display a virtual image;
a sensor unit configured to detect whether a user wearing the portable device is moving; and
a processor configured to control the camera unit, the display unit and the sensor unit,
wherein the processor is further configured to:
detect a marker object from the image,
display the virtual image corresponding to the marker object based on a location of the marker object,
move the virtual image based on a location change, when the location change of the marker object is detected from the image,
obtain a first moving speed corresponding to a moving speed of the virtual image or a second moving speed corresponding to a moving speed of the marker object,
if the first moving speed or the second moving speed is determined as faster than a first reference speed, lower the first moving speed to be slower than the first reference speed,
wherein if movement of the user wearing the portable device is detected, lower the first moving speed to be slower than a second reference speed, which is slower than the first reference speed.

17. The portable device of claim 16, wherein the sensor unit is further configured to detect a moving speed and a moving direction of the user wearing the portable device, and
wherein the processor is further configured to determine the second reference speed based on at least one selected from the group consisting of the first moving speed of the virtual image, the second moving speed of the marker object, the moving speed of the user and the moving direction of the user.

18. The portable device of claim 16, wherein the processor is further configured to:
if movement of the user wearing the portable device is detected and a change of a viewing angle of the camera unit is detected, lower the first moving speed to the second reference speed, which is slower than the first reference speed.

19. A method of controlling a portable device, comprising the steps of:
capturing an image in front of the portable device;
detecting a marker object from the image;
displaying a virtual image corresponding to the marker object based on a location of the marker object; and
terminating a display of the virtual image corresponding to the marker object,
when the detecting of the marker object is terminated,
terminate a display of the virtual image based on a first terminate mode if the gaze location of the user is detected at a first location, and
terminate the display of the virtual image based on a second terminate mode if the gaze location of the user is detected at a second location.

20. A method of controlling a portable device, comprising the steps of:
capturing an image in front of the portable device;
detecting a marker object from the image;
displaying a virtual image corresponding to the marker object based on a location of the marker object;
if a location change of the marker object is detected from the image, moving the virtual image based on the location change obtaining a moving speed of the virtual image or a moving speed of the marker object; and
if the moving speed of the virtual image or the moving speed of the marker object is determined as faster than a first reference speed, lowering the moving speed of the virtual image to be slower than the first reference speed,
wherein if movement of the user wearing the portable device is detected, lowering the first moving speed to be slower than a second reference speed, which is slower than the first reference speed.

* * * * *